(12) United States Patent
Kaplan et al.

(10) Patent No.: US 11,948,352 B2
(45) Date of Patent: Apr. 2, 2024

(54) SPECULATIVE TRAINING USING PARTIAL GRADIENTS UPDATE

(71) Applicant: Amazon Technologies, Inc., Seattle, WA (US)

(72) Inventors: Patricio Kaplan, Palo Alto, CA (US); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 953 days.

(21) Appl. No.: 16/831,060

(22) Filed: Mar. 26, 2020

(65) Prior Publication Data

US 2021/0304008 A1 Sep. 30, 2021

(51) Int. Cl.
| | |
|---|---|
| *G06N 3/084* | (2023.01) |
| *G06N 3/063* | (2023.01) |
| *G06N 5/046* | (2023.01) |
| *G06N 20/00* | (2019.01) |
| *G06V 10/764* | (2022.01) |
| *G06V 10/82* | (2022.01) |
| *G06V 10/94* | (2022.01) |

(52) U.S. Cl.
CPC ............ *G06V 10/955* (2022.01); *G06N 3/063* (2013.01); *G06N 3/084* (2013.01); *G06N 5/046* (2013.01); *G06N 20/00* (2019.01); *G06V 10/764* (2022.01); *G06V 10/82* (2022.01)

(58) Field of Classification Search
CPC ........ G06N 3/063; G06N 20/00; G06N 5/046; G06N 3/084
See application file for complete search history.

(56) References Cited

U.S. PATENT DOCUMENTS

| | | | |
|---|---|---|---|
| 11,132,602 B1 * | 9/2021 | Xie | ...................... G06F 9/44552 |
| 2021/0158167 A1 * | 5/2021 | Sharma | .................. G06N 20/00 |

FOREIGN PATENT DOCUMENTS

WO WO-2020226634 A1 * 11/2020 ............... G06N 3/04

* cited by examiner

*Primary Examiner* — Abdullah Al Kawsar
*Assistant Examiner* — Tewodros E Mengistu
(74) *Attorney, Agent, or Firm* — Weaver Austin Villeneuve & Sampson LLP

(57) ABSTRACT

The exchange of weight gradients among the processing nodes can introduce a substantial bottleneck to the training process. Instead of remaining idle during the weight gradients exchange process, a processing node can update its own set of weights for the next iteration of the training process using the processing node's local weight gradients. The next iteration of training can be started by using these speculative weights until the weight gradients exchange process completes and a global weights update is available. If the speculative weights is close enough to the weight values from the global weights update, the training process at the processing node can continue training using the results computed from the speculative weights to reduce the overall training time.

20 Claims, 16 Drawing Sheets

SPECULATIVE TRAINING USING PARTIAL GRADIENTS UPDATE

BACKGROUND

Neural networks can be used to perform tasks such as recognizing an object in an image. In a neural network, input data are combined with weights to derive output data using activation functions. For example, a neural network may take an image as input data, and output a decision or likelihood that a certain object is in the image. The set of weights used in a neural network can be determined by a training process, in which the neural network can learn how to perform a certain computing task for an application. The training process involves supplying the neural network with training input data and a corresponding reference output which supports a particular decision (e.g., a detection or a non-detection of an object in an image). The neural network can perform computations to combine the weights with the training input data to generate training output data, and the training output data can be compared against the reference output data to assess the accuracy of the neural network model. During training, different training input data sets can be provided to generate different training output data sets. The weights of the neural network can be adjusted to minimize the differences between the training output data and the reference output data. To improve the likelihood of the neural network generating a correct decision, a large volume of training input data covering a large number of scenarios can be used to train the neural network. As a result, training a neural network may take a lot of time and computational resources.

BRIEF DESCRIPTION OF THE DRAWINGS

Various embodiments in accordance with the present disclosure will be described with reference to the drawings, in which.

DETAILED DESCRIPTION

Figure 1:
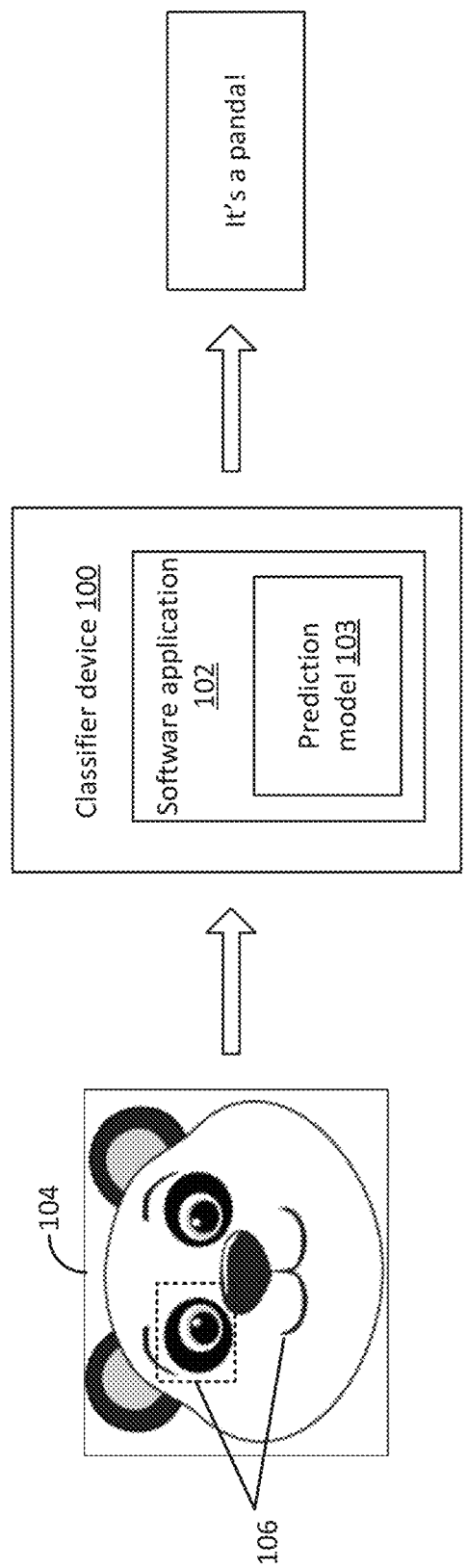
FIG. 1 illustrates an example of a classifier device.

A neural network typically includes a number of cascading neural network layers each associated with a set of weights. In an inference operation, a first neural network layer can receive an input data set, combine the input data set with the weights (e.g., by multiplying the input data set with the weights and then summing the products) to generate a first output data set for the layer, and to propagate the output data set to a second neural network layer in a forward propagation operation. The second neural network layer performs another set of forward propagation operations on the first output data set from the first layer to generate a second output data set, and to propagate the second output data set to higher neural network layers. The forward propagation operations can start at the first neural network layer and end at the highest neural network layer. The forward propagation operations at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on the result of processing the extracted features at the neural network layers.

The set of weights of the neural network can be generated and/or updated by a training process to improve the likelihood of the neural network outputting a correct decision. An example training process can use a gradient descent scheme. As part of the training process, forward propagation operations can be performed on a training input data set using the set of weights at each neural network layer to generate a training output data set at the highest level neural network layer. The training output data set can be compared with a reference output data set to determine the error of the neural network model operating on the training input data, and this error can be used to adjust the weights of the model to improve the accuracy of the neural network.

As part of the training process, each neural network layer can perform backward propagation operations to adjust the set of weights at each neural network layer. During backward propagation, the error or the difference between the training output data set and the reference output data set is propagated backward from the highest neural network layer back towards the first neural network layer. At each layer, a set of weight gradients is calculated based on the error to determine the amount of adjustment to make to each weight value. One iteration of the training process is completed when the weights of each layer have been adjusted. The next iteration of the training process can then be performed with the updated weights, and the training process can be repeated for a number of iterations until a loss objective is achieved, such as minimizing the error or until the error lowers to a certain threshold.

The training process can be very time-consuming due to the sequential nature and data dependency among the operations involved. As described above, forward propagation operations are first performed to compute a training output data set, and then backward propagation operations are performed to compute the weight gradients. The weights at each neural network layer can then be updated using the weight gradients. Due to the data dependency between backward propagation operations and the forward propagation operations, the two sets of operations cannot be performed in parallel. Moreover, the next iteration of the training process cannot be started until the weight values have been updated. The lack of parallelism can drastically increase the training time, which is further increased when multiple iterations of the training process are performed to achieve the loss objective. Moreover, the training process typically involves supplying the neural network with multiple sets of training input data to cover different input scenarios, such that the neural network can be trained to provide a correct decision over a wide range of input. The computing system that implements the neural network will need to perform training on a large number of input data sets, which further increases the training time. The training process may also require a higher precision than the inference operation, resulting in additional strain on the computational resources.

One way to accelerate a training process is by using a distributed system in which the training process is distributed across multiple computing systems, each of which can be configured as a processing node. A training input data set can be split into multiple portions, with each portion to be processed by a processing node. Each processing node can perform the forward and backward propagation operations independently based on a portion of the training input data to generate a set of weight gradients for each neural network layer. At each iteration of the training process, each processing node can exchange its set of weight gradients with other processing nodes, and average its set of weight gradients and the sets of weight gradients received from other processing nodes. Each processing node can then update the set of weights for each neural network layer based on the averaged weight gradients calculated for that layer.

Distributing the training process across multiple processing nodes can reduce the amount of training input data processed at each processing node, which can reduce the times of completion of the forward and backward propagation operations at each neural network layer to accelerate the training process. However, the exchange of weight gradients among the processing nodes can introduce a substantial bottleneck to the training process. For example, in a case where the distributed system is in a cloud infrastructure and the processing nodes exchange weight gradients with each other by sending network packets, the network latency can be substantial relative to the times of completion of the forward/backward propagation operations. This can cause each processing node to be idle while waiting for the next set of weights to become available for the next iteration of training process. As such, the network latency to exchange weight gradients can diminish the reduction in the training time brought by the distributed system, or even increase the training time if using a large number of processing nodes.

According to some implementations, to improve the throughput of the system, instead of remaining idle while waiting for the next set of weights to become available through the gradients exchange process, each processing node can update its own set of weights using the local weight gradients to generate a set of speculative weights. The next iteration of the training process can be performed using the set of speculative weights while the gradients exchange process is being performed in parallel to obtain the next set of weights. When the next set of weights become available, the next set of weights obtained from the gradients exchange process can be compared with the set of speculative weights to determine a difference between the two sets of weights. This difference represents the delta between the set of speculative weights updated using the local weight gradients of the processing node and the set of weights updated using the averaged gradients taken over the processing nodes of the system. If the difference is below a threshold difference, the set of speculative weights for the local processing node is close enough to the global updated weights, and the training process at the processing node can continue using the results of speculative weights. Thus, instead of remaining idle while waiting for the global weights updates, each processing node can initiate and perform the next iteration of the training processing using the locally updated speculative weights.

In some instances, if the difference between the set of speculative weights and the global updated weights exceeds the threshold difference, the set of speculative weights may be too far off from the global updated weights. In such instances, the computations performed using the set of speculative weights may be discarded, and the iteration of the training process can be repeated using the global updated weights instead of the speculative weights. Although there is some overhead cost associated with restarting an iteration of the training process, the number of instances where an iteration of the training process has to be repeated is expected to be small as compared to the number of instances where the results from using the speculative weights are usable. As such, despite the possibility of having to repeat an iteration of the training process, the overall training can be completed faster as compared to systems in which the processing nodes remain idle during the gradients exchange process.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a classifier device 100 in which the techniques disclosed herein can be used to process data. Classifier device 100 can be, for example, a computing device executing a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It should be understood that the image recognition service is merely provided as an illustrative example, and that the techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The neural network may include a plurality of processing nodes, with each processing node configured to process part of the input pixel data, or to further process the intermediate outputs from other processing nodes. FIG. 1 illustrates an example of prediction model 103 that may use the techniques disclosed herein. In FIG. 1, prediction model 103 may be a multi-layer neural network such as a deep neural network (DNN), a convolutional neural network (CNN), etc.

Figure 2:
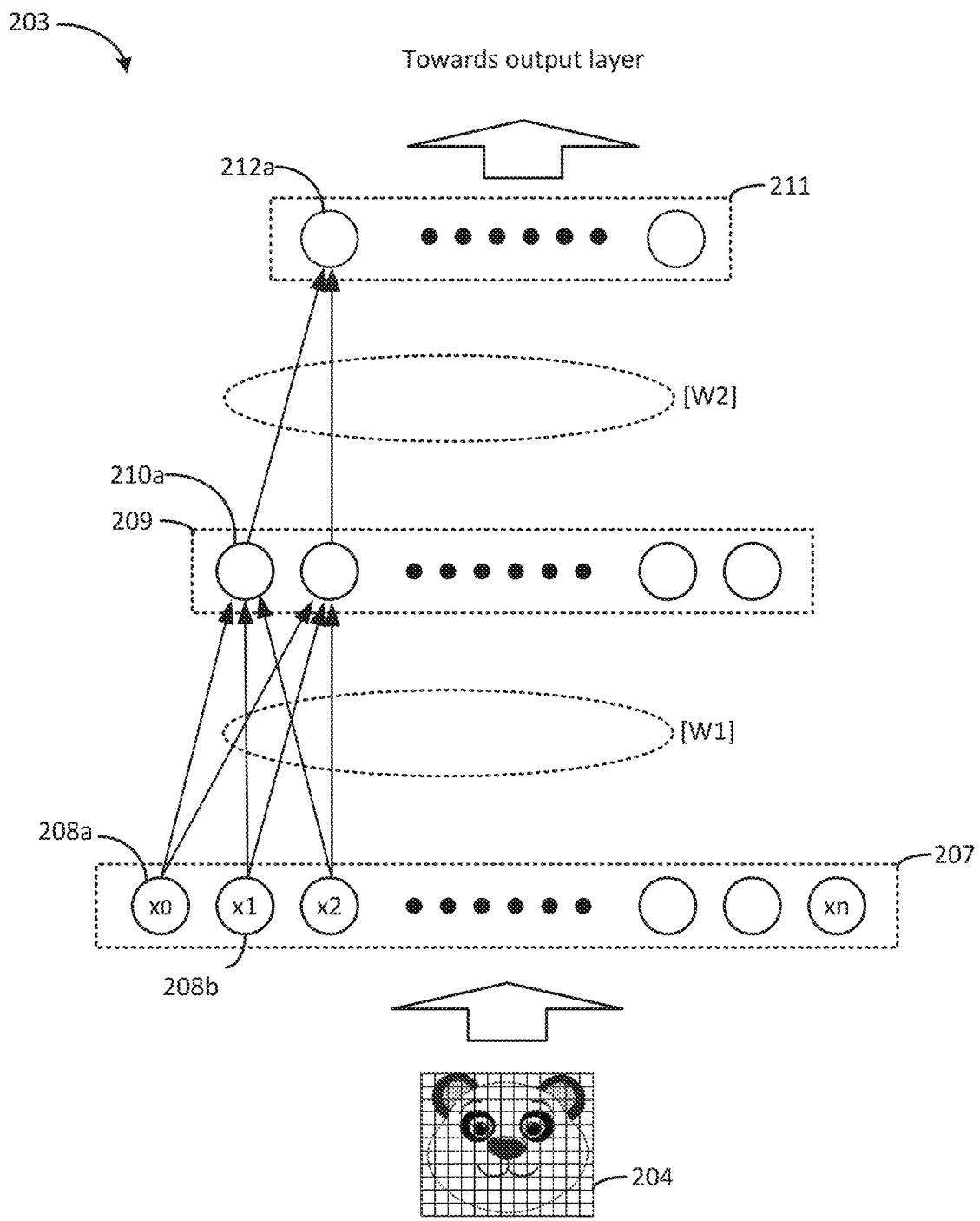
FIG. 2 illustrates a simplified block diagram of an example of a prediction model.

Referring to FIG. 2, prediction model 203 may include an input layer 207, a set of intermediate layers including intermediate layers 209 and 211, and an output layer (not shown in FIG. 2). It is understood that prediction model 203 can also include other different types of neural networks including, for example, long short-term memory (LSTM), multilayer perception (MTP), multiscale densenet (MSD-NET), etc.

Layer 207 may process pixel data representing different portions of the image under analysis. For example, in the example of FIG. 2, layer 207 may process the pixel data of image 204. Each processing node of layer 207 is assigned to receive a pixel value (e.g., $x_0, x_1, x_2, \ldots$ corresponding to a predetermined pixel within image 204, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 203 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n} (W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 203 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 203 is a CNN, each processing node of layer 209 may generate the intermediate output based on the scaling of pixel values from a group of processing nodes of layers 207. The intermediate output may represent a convolution result between a group of pixel values and a filter comprising the weight values.

Figure 3:
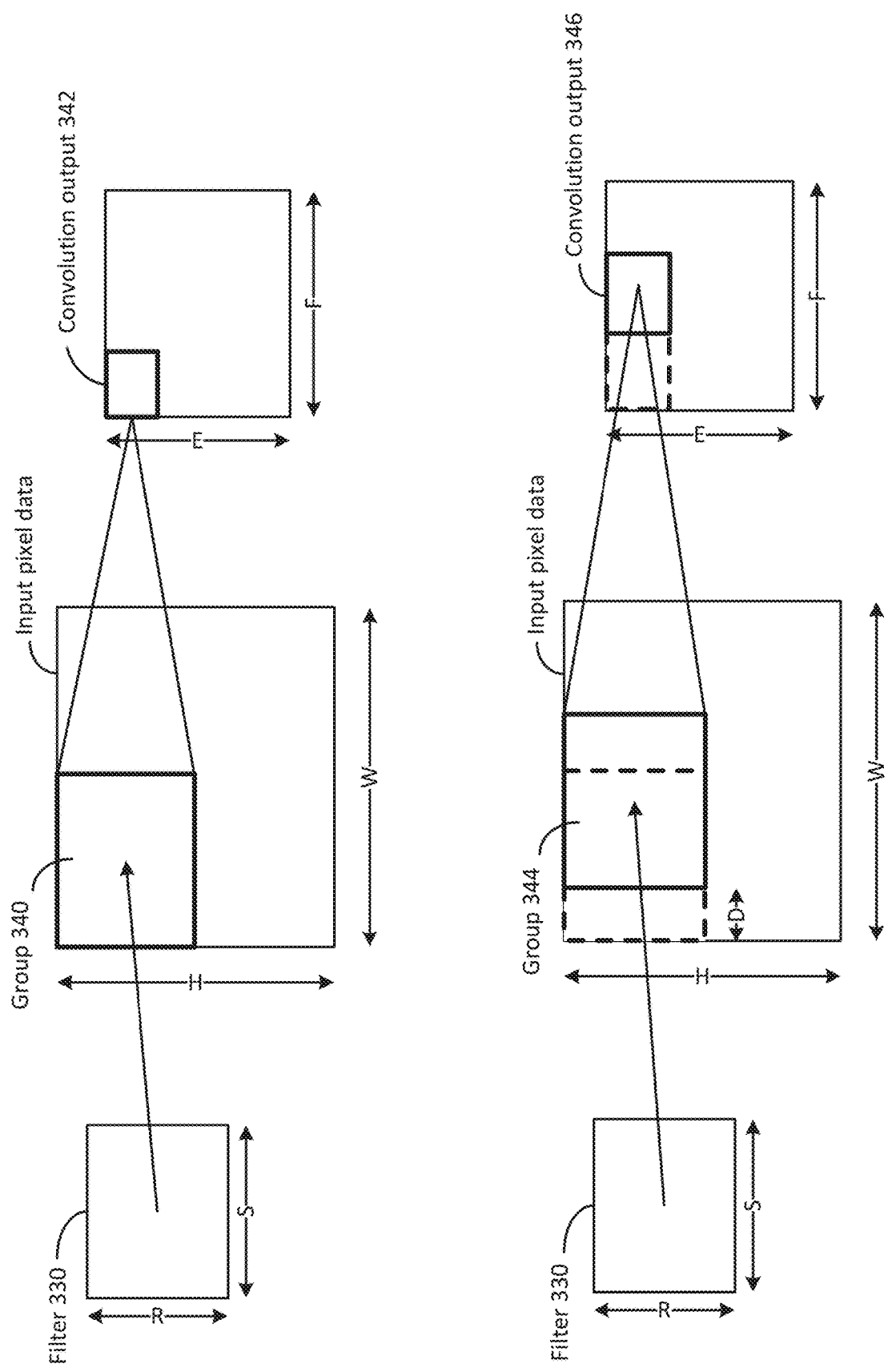
FIG. 3 illustrates a simplified block diagram of an example of an operation performed using a prediction model.

FIG. 3 illustrates an example of a convolution operation that layer 209 may perform. In FIG. 3, filter 330 may include a two-dimensional array of weights. The weights in filter 330 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 340 of pixel values corresponding to a first rectangular block of pixels from the input image, which corresponds to a first stride location of filter 330, and generate a convolution output 342 based on a summation of multiplication results between each weight of filter 330 and each corresponding pixel in group 340 according to Equation 1, to generate a dot-product between a matrix represented by filter 330 and a matrix represented by group 340. Another processing node of layer 209 can also receive, from another group of processing nodes of input layer 207, a group 344 of pixel values corresponding to a second rectangular block of pixels from the input image corresponding to a second stride location of filter 330, and generate a convolution output 346 based on a summation of multiplication results between each weight of filter 330 and each corresponding pixel in group 344 according to Equation 1, to generate a dot-product between the matrix of filter 330 and a matrix represented by group 340. In some examples, each convolution output in FIG. 3 (e.g., convolution output 342, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 3, the convolution operations can be arranged in a sliding-window such that the second rectangular block overlaps, or is otherwise adjacent to, the first rectangular block in the input image. For example, in the example of FIG. 3, D may be a distance of stride (in pixel) of the sliding-window for each convolution operation, such that the block of pixels corresponding to group 344 may be situated at a distance D (in terms of pixels) from the block of pixels corresponding to group 340, and the next block of pixels may also be situated at the same distance D from group 344. Other processing nodes of layer 309 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 2)}$$

In addition to ReLU, other forms of activation function can also be used including, for example, a softplus function (which can be a smooth approximation of a ReLU function), a hyperbolic tangent function (tan h), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first output}_{210a} = ReLU(Sum_{210a}) \quad \text{(Equation 3)}$$

Optionally, prediction model 203 may include a pooling layer to reduce the number of intermediate outputs (e.g., $sum_{210a}$) of layer 209. The pooling layer may group the intermediate outputs and perform a pooling operation on each group. The pooling operation may include such as max pooling (e.g., selecting a maximum intermediate output within the group), min pooling (e.g., selecting a minimum intermediate output), average pooling (e.g., finding an average of each group), summation pooling (finding a sum of each group), etc., and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2). The output layer may form an output vector representing, for example, a probability that certain features are included in image 204, and/or a probability that image 204 includes an image of a panda. For example, the output vector may be compared against a reference vector associated with a nose object of a panda, or a reference vector associated with a panda. A decision about whether image 204 is an image of a panda can be determined based on the comparison result.

The weights and filter coefficients described in FIGS. 2-3 can be generated and updated by a training process, to improve the likelihood of prediction model 203 generating a correct decision. Referring to the examples of FIGS. 2-3, prediction module 203 can be trained based on a set of training images. The training images can include images of different pandas, images of other animals and other artifacts, etc. Prediction model 203 can process those images and generate different output vectors. The weights in the neural network layers of prediction model 203 can be updated to maximize the number of correct decisions (e.g., detection of a panda in training images that contain a panda, non-detection of a panda in training images that do not contain an panda, etc.) by the prediction model 203.

Figure 4:
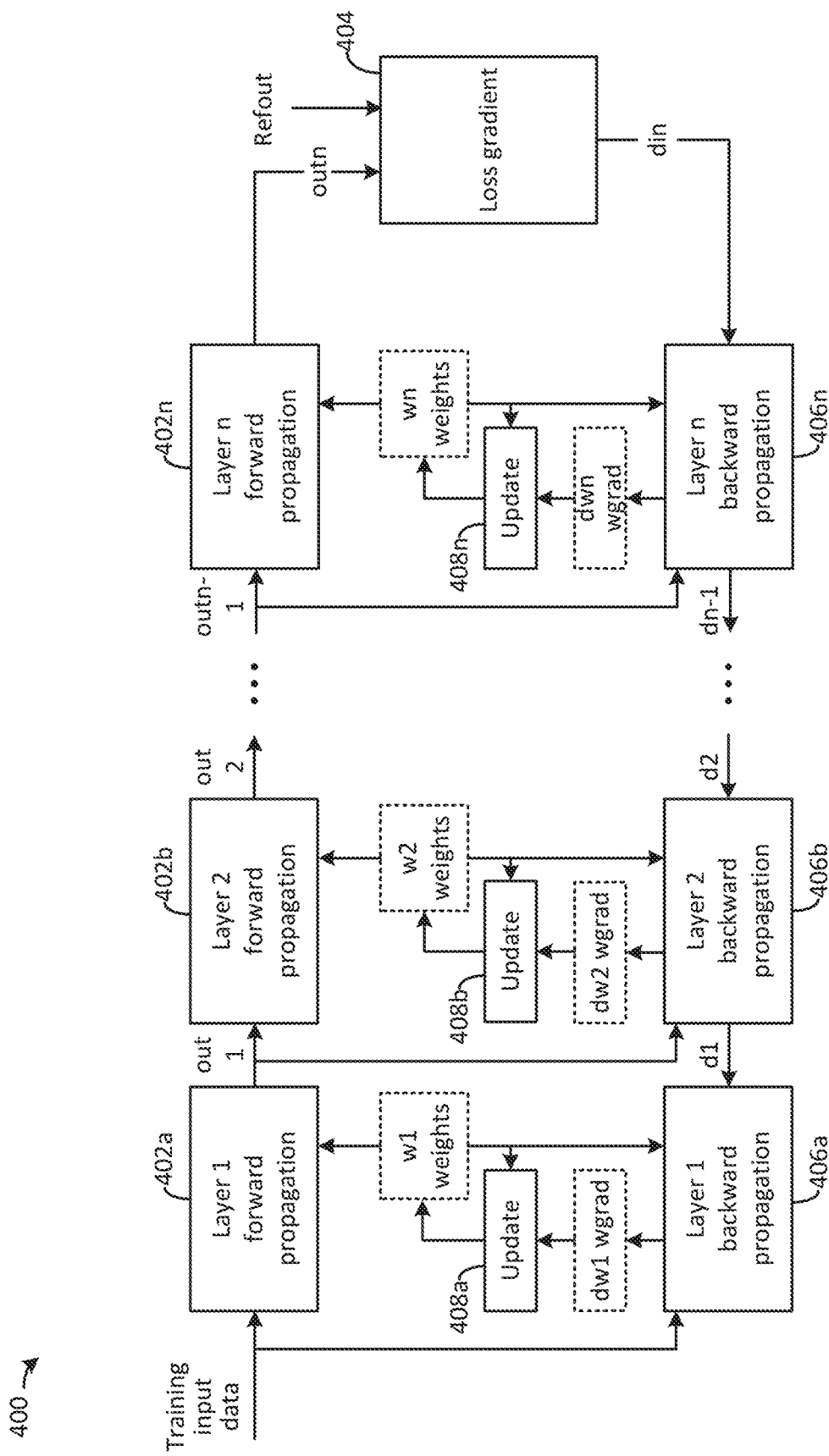
FIG. 4 illustrates an example of a training process of a neural network.

FIG. 4 illustrates an example of a training process 400 to train a neural network, which may include the neural network of prediction model 203. A training process can be performed by, for example, a neural network hardware accelerator that implements the neural network, a general purpose hardware processor, or other suitable computing systems that support the arithmetic operations involved in neural network processing as described above. The training can be based on a gradient descent scheme, which includes forward propagation operations, loss gradient operation, and backward propagation operations. Specifically, as shown in FIG. 4, a forward propagation operation can be performed for each neural network layer, such as a forward propagation operation 402a for the lowest layer 1 (which can correspond to input layer 207 of FIG. 2), a forward propagation operation 402a for layer 2 (which can correspond to layer 209 of FIG. 2), a forward propagation operation 402n for the highest layer n (which can correspond to layer 211 of FIG. 2), etc. A forward propagation operation at a neural network layer can include the multiplication and summation computations between input data and a set of weights for that layer, followed by activation function processing, as described above in Equations 1 and 2, to generate output data. The output data can then propagate to the next neural network layer as input to the forward propagation operation at that layer. For example, as shown in FIG. 4, forward propagation operation 402a can combine training input data with W1 weights of layer 1 to generate output data out1, which propagate to layer 2 as input. Forward propagation operation 402b can combine data out1 with W2 weights of layer 2 to generate output data out2, which can then propagate to the next layer. At the highest layer n, forward propagation operation 402n receive data outn−1 from layer n−1 (not shown in FIG. 4), combine with Wn weights of layer n, and generate output data outn.

A loss gradient operation 404 can compare the output data outn of layer n against reference output data refoutn to generate input data gradients din. The input data gradients din can measure a rate of difference between outn and refoutn with respect to each data element of output data outn. In some examples, an objective of the training is to minimize the difference between outn and refoutn such that the input data gradients din become close to zero.

Following the generation of input data gradients din by loss gradient operation 404, a backward propagation operation 406 can be performed for each neural network layer. For example, a backward propagation operation 406n can be performed at highest layer n, a backward propagation operation 406b can be performed at layer 2, a backward propagation operation 406a can be performed at layer 1. A backward propagation operation at a neural network layer can be based on the weights of that neural network layer, the data gradient input to that neural network layer, as well as the input to the forward propagation operation of that layer. For example, for layer n, backward propagation operation 406n can receive, as inputs, weights wn, input data outn−1 (from forward propagation operation at neural network layer n−1), and input data gradient din. The backward propagation operation can perform multiplication and summation computations similar to those of Equation 1 on the input to generate output data gradients (dn−1, d2, d1, etc. in FIG. 4) and weight gradients wgrad (dwn, dw2, dw1, etc. in FIG. 4). The output data gradients can be forwarded to the next lower neural network layer as inputs to the backward propagation operation in that layer, whereas the weight gradients can represent changes to be applied to weights at a neural network layer. The weights at layer n can be updated by an update operation 408 (e.g., update operation 408n for layer n) based on the weight gradients dwn based on the following equation:

$$wn' = wn - \alpha \times dwn \quad \text{(Equation 4)}$$

In Equation 4, wn' can refer to the updated weights wn, whereas α can include a set of pre-determined constants.

The output data gradients dn−1 generated by layer n can then propagate to the next lower neural network layer n−1 as input to the backward propagation operation at that layer. Backward propagation operation 402b of layer 2 can operate on data gradients d2, weights w2, and input data out1 to generate output data gradients d1 as well as weight gradients dw2. Weight gradients dw2 can be used by update operation 408b to update w2 weights based on Equation 4. Data gradients d1 can propagate to layer 1. Backward propagation operation 402a of layer 1 can operate on data gradients d2, weights w1, and training input data to generate weight gradients dw1. Weight gradients dw1 can be used by update operation 408a to update w1 weights based on Equation 4.

A training process typically involves supplying the neural network with multiple sets of training input data to cover different operation conditions, such that the neural network can be trained to provide a correct decision under those different operation conditions. Due to limited computation resources, the computing system (e.g., a neural network hardware accelerator) typically lacks the capability to use all the training input data sets at one time to perform the training. Instead, the training input data can be split into multiple portions. The computing system can perform the training process sequentially in batches, with each batch to operate on a portion of the training input data.

A training process performed on a single computing system can be very time-consuming due to the sequential nature of the training process. Specifically, as described above, in a training process a forward propagations is first performed at each neural network layer to compute a training output data set, and then a backward propagation is performed at each neural network layer to compute the weight gradients, which is then followed by the updating of the weights at each neural network layer. As the backward propagation operations depend on the forward propagation operations, the two sets of operations cannot performed in parallel. Moreover, due to data dependency among the neural network layers, the forward propagation operations and the backward propagation operations also need to be performed sequentially for each neural network layer. The lack of parallelism can drastically increase the training time, which is further increased when multiple batches of the training process are performed for different portions of the training input data set, and the batches are repeated in multiple iterations to converge towards minimum data gradients.

One way to accelerate a training process is by using a distributed system, to distribute the training process across multiple computing devices, each of which can be configured as a processing node. Distributing the training process across multiple processing nodes can reduce the amount of training data to be processed at each processing node, which can reduce the time of completion of the forward and backward propagation operations and accelerate the training process. For example, as the volume of training data processed by each processing nodes has been reduced, the durations of the forward propagation operation and backward propagation operation can be shorter.

Figure 5:
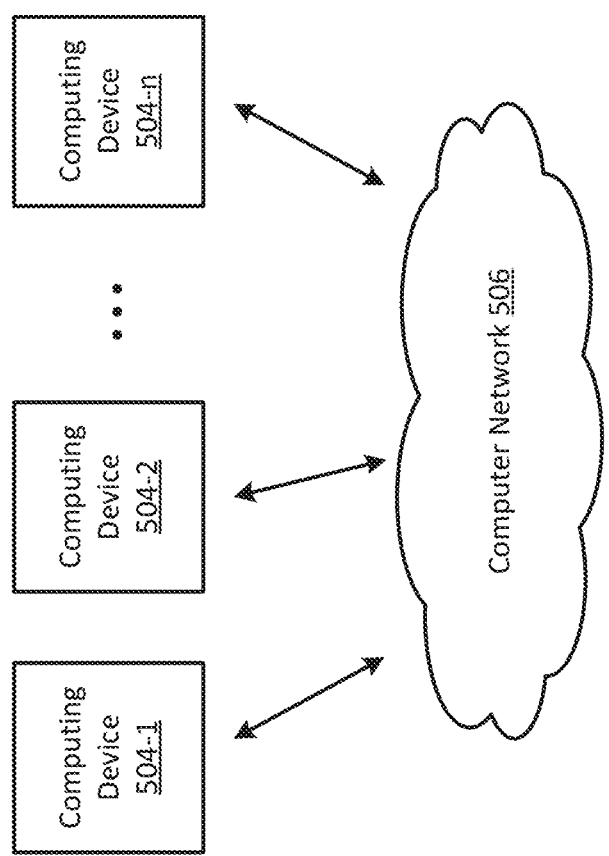
FIG. 5 illustrates a diagram of an example of a distributed system.

FIG. 5 illustrates a distributed system that can perform a training process for a neural network, according to some implementations. As shown in FIG. 5, the distributed system may include a number of computing devices 504-1, 504-2, . . . to 504-n, etc. Each computing device can include a communication interface to communicate with each other via a computer network 506. Each computing device can represent a processing node and include computing resources to perform the operations of a training process including forward propagation operations, backward propagation operations, update weights operations, etc. The computing resources may include, for example, a neural network processor, neural network accelerator, a graphics processing unit (GPU), a field programmable gate array (FPGA), a processor or co-processor, an application specific integrated circuit (ASIC), and/or other suitable computing circuitry that support the arithmetic operations involved in the training process. Each computing device can communicate, via computer network 506, with other computing devices to exchange weight gradients to perform exchange operations, and perform update weights operations after the exchange operations are completed.

In order to update the weight values after each iteration of the training process, the weight gradients computed by each processing nodes are exchanged with the other processing nodes such that a set of averaged weight gradients can be computed and used to update the weights of the system. The exchange of the weight gradients among the processing nodes can introduce substantial bottleneck to the training process. For example, in a case where the distributed system is in a cloud infrastructure and each processing node exchange weight gradients with each other by sending network packets, the network latency can be substantial relative to the times of completion of the forward/backward propagation operations. As a result, the duration of exchange weight gradients operations can be much larger than that of the forward propagation operations and backward propagation operations. As the weight gradients exchange operations are serialized with forward propagation operations and backward propagation operations, the weight gradients exchange operations can add significant delay to the training process and increase the training time.

Figure 6:
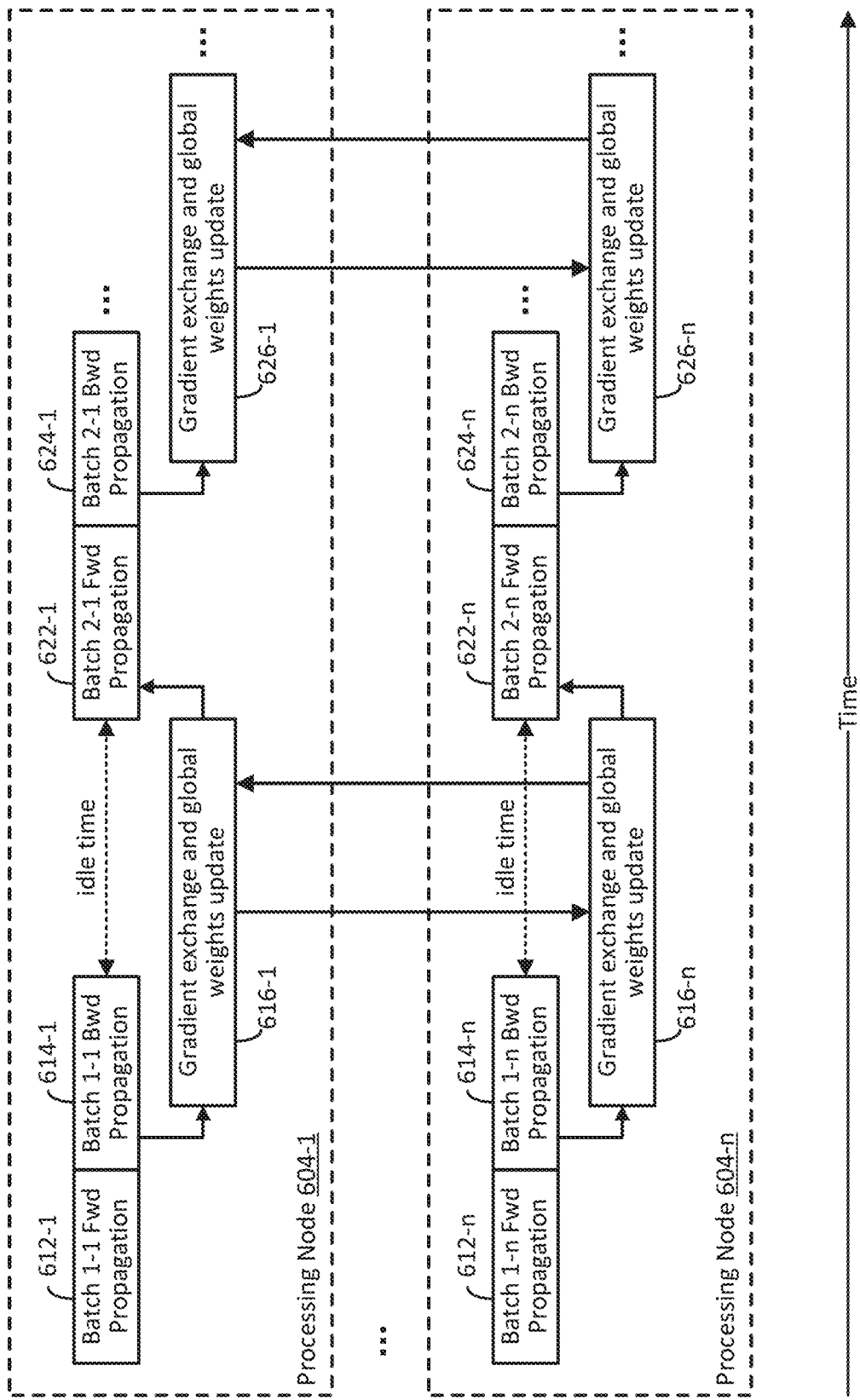
FIG. 6 illustrates a timing diagram of an example of a training process.

FIG. 6 illustrates the timing diagram of an example of a training process performed in a distributed neural network training system. The distributed neural network training system may include two or more processing nodes 604-1 to 604-n. The processing nodes 604-1 to 604-n can be implemented using any combination of neural network processors, neural network accelerators, graphics processing units (GPUs), field programmable gate arrays (FPGAs), processors, and/or application specific integrated circuit (ASIC) devices.

To speed up the training process, each of processing nodes 604-1 to 604-n can perform training on a subset of the totality of the training data set in parallel. For example, if the training data set includes ten thousand images and there are ten processing nodes, each processing node may train on one thousand images. Although the training data set can be divided equally amongst the processing nodes, some systems may distribute the workload differently (e.g., a processing node that has faster hardware may be assigned a larger workload).

Referring to FIG. 6, processing node 604-1 may perform a first iteration of the training process on a portion of the training data such as the batch 1-1 input data set. The first iteration of the training process may include performing forward propagation 612-1 and backward propagation 614-1 using the neural network computation circuitry of the processing node. During forward propagation 612-1, computations are performed on the batch 1-1 input data set from the lowest neural network layer to the highest neural network layer using a set of weights to generate an output data set. The output data set can be compared with a reference output data set to determine the amount of error between the output of the neural network model and the expected output when operating on the batch 1-1 input data set. During backward propagation 614-1, the error of the neural network model operating on the batch 1-1 input data set is propagated from the highest neural network layer back to the lowest neural network layer to determine a set of local weight gradients for processing node 604-1 representing the amount of adjustment to make to the weight values of each layer.

Similarly, processing node 604-n may perform a first iteration of the training process on a different portion of the training data such as the batch 1-n input data set. The first iteration of the training process at processing node 604-n may include performing forward propagation 612-n and backward propagation 614-n. During forward propagation 612-n, computations are performed on the batch 1-n input data set using the same set of weights as in processing node 604-1 to generate an output data set. The output data set can be compared with a reference output data set to determine the amount of error between the output of the neural network model and the expected output when operating on the batch 1-n input data set. During backward propagation 614-n, the error of the neural network model operating on the batch 1-n input data set is propagated from the highest neural network layer back to the lowest neural network layer to determine a set of local weight gradients for processing node 604-n representing the amount of adjustment to make to the weight values of each layer.

Because each of processing nodes 604-1 to 604-n are operating on a different portion of the training data set, the amount of error through the first iteration of the training process can vary among the different processing nodes. To improve the accuracy of the neural network model across the different training data, the local weight gradients calculated by each processing node can be accumulated and then averaged to derive a set of averaged weight gradients. For example, if the neural network model utilizes twenty weight values, the first iteration of the training process at each processing node will produce twenty local weight gradients. The first local weight gradient from each processing node can be added together and be divided by the number of processing nodes to derive an averaged weight gradient for the first weight value. The calculation can be performed for each of the twenty weight gradients to derive a set of twenty averaged weight gradients.

The weight values of the neural network model can then be updated using the set of averaged weight gradients to derive the next set of weights to use in the next iteration of the training process. For example, each weight value can be updated by multiplying the corresponding averaged weight gradient with a scalar representing a learning rate, and adding the result to the weight value. In order to obtain the next set of weights to use in the next iteration of the training process, processing nodes 604-1 may perform a gradients exchange and global weights update process 616-1, and processing nodes 604-n may similarly perform a gradients exchange and global weights update process 616-n to obtain the next set of weights. As shown in FIG. 6, the second iteration of the training process at each processing node may not be started until the processing node has obtained the next set of weights.

Once the next set of weight values becomes available, processing node 604-1 may perform a second iteration of the training process including forward propagation 622-1 and backward propagation 624-1 on the batch 2-1 input data set. In some implementations, the batch 2-1 input data set can be the same as the batch 1-1 input data set if the system is to evaluate the accuracy of the updated model with respect to the same input data set used in the first iteration. In some implementations, the batch 2-1 input data set can be a different subset of the training data set than the batch 1-1 input data set. Processing node 604-n may similarly perform a second iteration of the training process including forward propagation 622-n and backward propagation 624-n on the batch 2-n input data set once processing node 604-n obtains the next set of weights from the global weights update process 616-n. The training process may repeat for any number of iterations until the error of the neural network model is lowered to a certain error threshold across the training data set, or reaches a minimum error.

The gradients exchange and global weights update process described above can be performed using different hardware than the hardware performing the forward and backward propagations. For example, the gradients exchange and global weights update process can be performed using a host processor and a communication interface, whereas the forward and backward propagations can be performed using neural network computation circuitry. The gradients exchange and global weights update process may involve each processing node transmitting its corresponding set of local weight gradients to one of the processing nodes, which accumulates the local weight gradients from the other processing nodes of the system, and calculates the average for each weight gradient. The processing node receiving the local weight gradients from the other processing nodes of the system may update each weight value of the neural network model using the corresponding averaged weight gradient to derive the next set of weights. The next set of weights can then be broadcasted from that processing node to the other processing nodes of the system. Alternatively, the local weight gradients from each processing node can be broadcasted to the other processing nodes, and each processing node may calculate its own set of averaged weight gradients and update the set of weights accordingly using the sets of local weight gradients received from the other processing nodes.

Depending on the number of processing nodes in the system, obtaining the next set of weights can take a significant amount of time, because the system has to gather the local weight gradients from each of the processing nodes across a network to compute the next set of weight values. As shown in FIG. 6, the neural network computation circuitry performing the forward and backward propagation operations is idle during this time while waiting for the next set of weights to become available, because the next iteration of the training process may not be started until the processing node obtains the next set of weights.

One way to reduce the latency of the weight update process is to initiate the gradients exchange as soon as the local weight gradients for a neural network layer becomes available. For example, during backward propagation 614-1, as soon as the error has been propagated through the highest neural network layer, the local weight gradients associated with the highest neural network layer can be calculated and be exchanged with the other processing nodes. As such, the gradients exchange and global weights update process 616-1 performed by processing node 604-1 need not wait for the entire backward propagation 614-1 to complete, but can be initiated as soon as the local weight gradients for the highest neural network layer becomes available. Accordingly, the gradients exchange and global weights update processes 616-1 and 616-n are shown in FIG. 6 as being initiated before completion of the corresponding backward propagation processes 614-1 and 614-n. Although starting the gradients exchange early in the manner described above can reduce the global weights update latency, there can still be a significant amount of idle time between the iterations of the training process (e.g., the idle time between backward propagate 614-1 and forward propagation 622-1).

Figure 7:
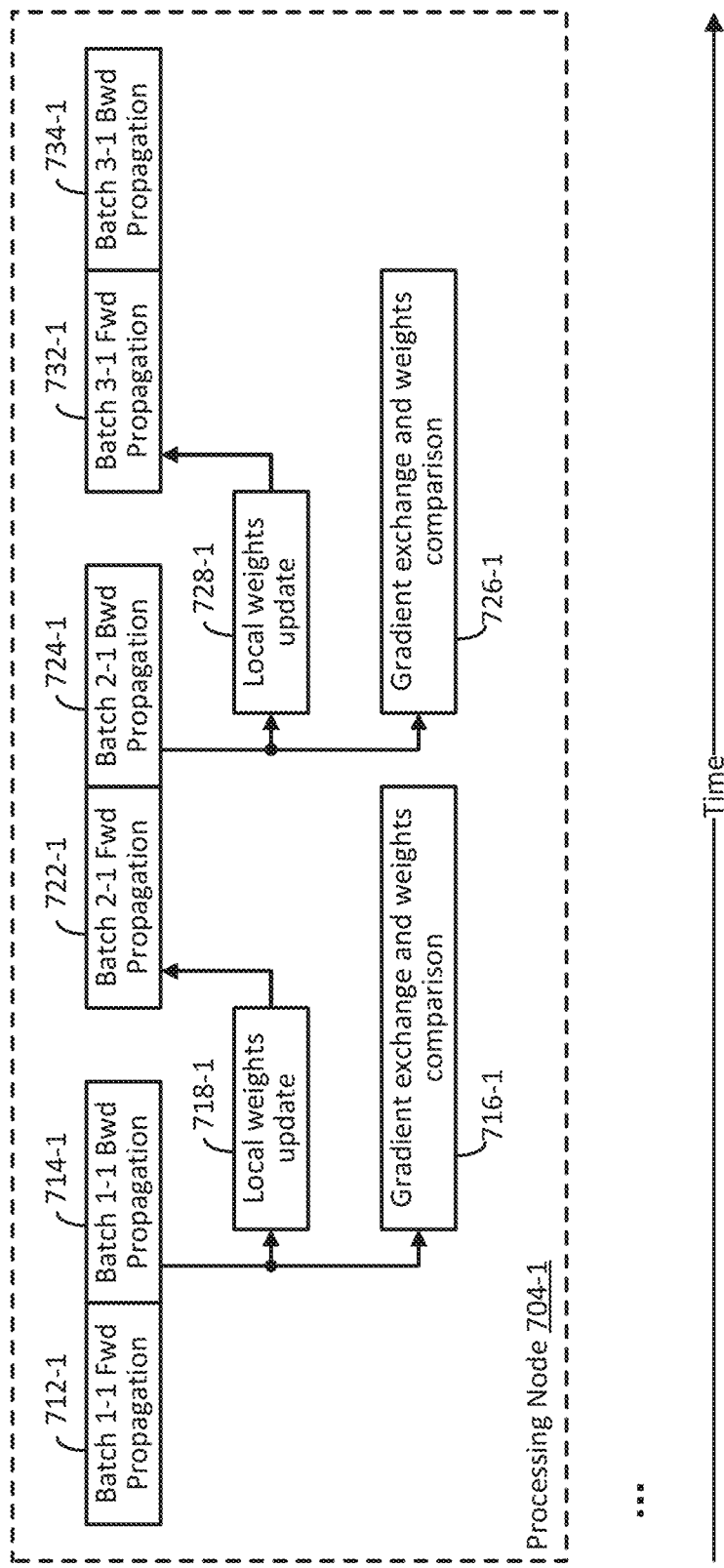
FIG. 7 illustrates a timing diagram of another example of a training process.

FIG. 7 illustrates the timing diagram of another example of a training process performed in a processing node of a neural network training system. Processing node 704-1 can be one of multiple processing nodes in a neural network training system. Although only one processing node 704-1 is shown in FIG. 7, it should be understood that the other processing nodes of the system may operate in a similar manner.

Processing node 704-1 may start training by performing a first iteration of the training process on a portion of the training data such as the batch 1-1 input data set. The first iteration of the training process may include performing forward propagation 712-1 and backward propagation 714-1. During forward propagation 712-1, computations are performed on the batch 1-1 input data set from the lowest neural network layer to the highest neural network layer using a set of weights to generate an output data set. The output data set can be compared with a reference output data set to determine the amount of error between the output of the neural network model and the expected output when operating on the batch 1-1 input data set. During backward propagation 714-1, the error of the neural network model operating on the batch 1-1 input data set is propagated from the highest neural network layer back to the lowest neural network layer to determine a set of local weight gradients for processing node 704-1 representing the amount of adjustment to make to the weight values of each layer.

As soon as the local weight gradients for the highest neural network layer is generated from backward propagation 714-1, processing node 704-1 may initiate a local weights update process 718-1. The local weights update process 718-1 may generate a set of speculative weights by updating the set of weights using the set of local weight gradients from processing node 704-1 without considering the local weight gradients from the other processing nodes of the system. As such, the local weights update process 718-1 can be performed much faster than the global weights update, because the local weights update process 718-1 need not exchange weight gradients with the other processing nodes of the system. Once the local weights update process 718-1 has updated the set of weights using the local weight gradients, processing node 704-1 may start the second iteration of the training process on the batch 2-1 input data set (which can be the same or different data set from the batch 1-1 input data set). The second iteration of the training process may include performing forward propagation 722-1 using the set of speculative weights to generate an output data set, comparing the output data set with a reference output data set to determine an error, and performing backward propagation 724-1 using the error to derive the next set of local weight gradients.

In parallel with the local weights update process 718-1, processing node 704-1 may also initiate a gradients exchange and weights comparison process 716-1. The gradients exchange and weights comparison process 716-1 may involve processing node 704-1 transmitting its set of local weight gradients to one of the processing nodes, which accumulates the local weight gradients from the processing nodes of the system, and calculates the average for each weight gradient. The processing node receiving the local weight gradients from the other processing nodes of the system may update each weight value of the neural network model using the corresponding averaged weight gradient to derive the next set of weights. Processing node 704-1 may then receive the next set of weights in a communication transmitted from the processing node that determined the next set of weights. Alternatively, processing node 704-1 may broadcast its set of local weight gradients to the other processing nodes, and receive a set of local weight gradients from each of the other processing nodes such that processing node 704-1 can calculate its own set of averaged weight gradients and generate the next set of weights accordingly.

Once processing node 704-1 has obtained the next set of weights (e.g., either by receiving the next set of weights in a communication from another processing node, or by calculating the next set of weights itself), processing node 704-1 can compare the set of speculative weights generated from the local weight gradients to the set of weights generated from the averaged weight gradients to determine the difference between the two sets of weights. In some implementations, the difference of the two sets of weights can be determined, for example, as the average of the differences between corresponding weight values from the two sets, the median of the differences between corresponding weight values from the two sets, the maximum of the differences between corresponding weight values from the two sets, or the root mean square of the differences between corresponding weight values from the two sets, etc. In other implementations, other metrics can be used to measure the difference between the two sets of weights.

The gradients exchange and weights comparison process 716-1 may then compare the difference between the two sets of weights with a threshold difference to determine how close the set of speculative weights is to the actual weights calculated from the averaged weight gradients. If the difference between the two sets of weights is at or below the threshold difference, then the speculative weights are close enough to the actual weights, and the training process can continue using the results obtained from performing the second iteration of the training process with the set of speculative weights. In other words, processing node 704-1 can continue training the neural network model with the results obtained from using the set of speculative weights in forward propagate 722-1 and backward propagation 724-1, and proceed with further iterations of the training process.

As shown in FIG. 7, the training process may continue by performing a local weights update 728-1 using the set of local weight gradients determined form backward propagation 724-1 to enable initiation of the third iteration of the training process on the batch 3-1 input data set while waiting for the next set of weights to become available from the gradients exchange and weights comparison process 726-1. The training process may repeat for any number of iterations until the error of the neural network model is lowered to a certain error threshold across the training data set, or reaches a minimum error.

As can be seen by comparing FIG. 7 with FIG. 6, allowing the training process to proceed using speculative weights derived from the processing node's own set of local weight gradients can reduce the amount of idle time of the neural network computation circuitry between the backward propagation of a previous iteration and the forward propagation of the next iteration. Subsequent training iterations can be initiated without waiting for the gradients exchange and global weights update process to finish. This can improve the overall throughput of the system, and training across the full training data set can be completed faster.

Figure 8:
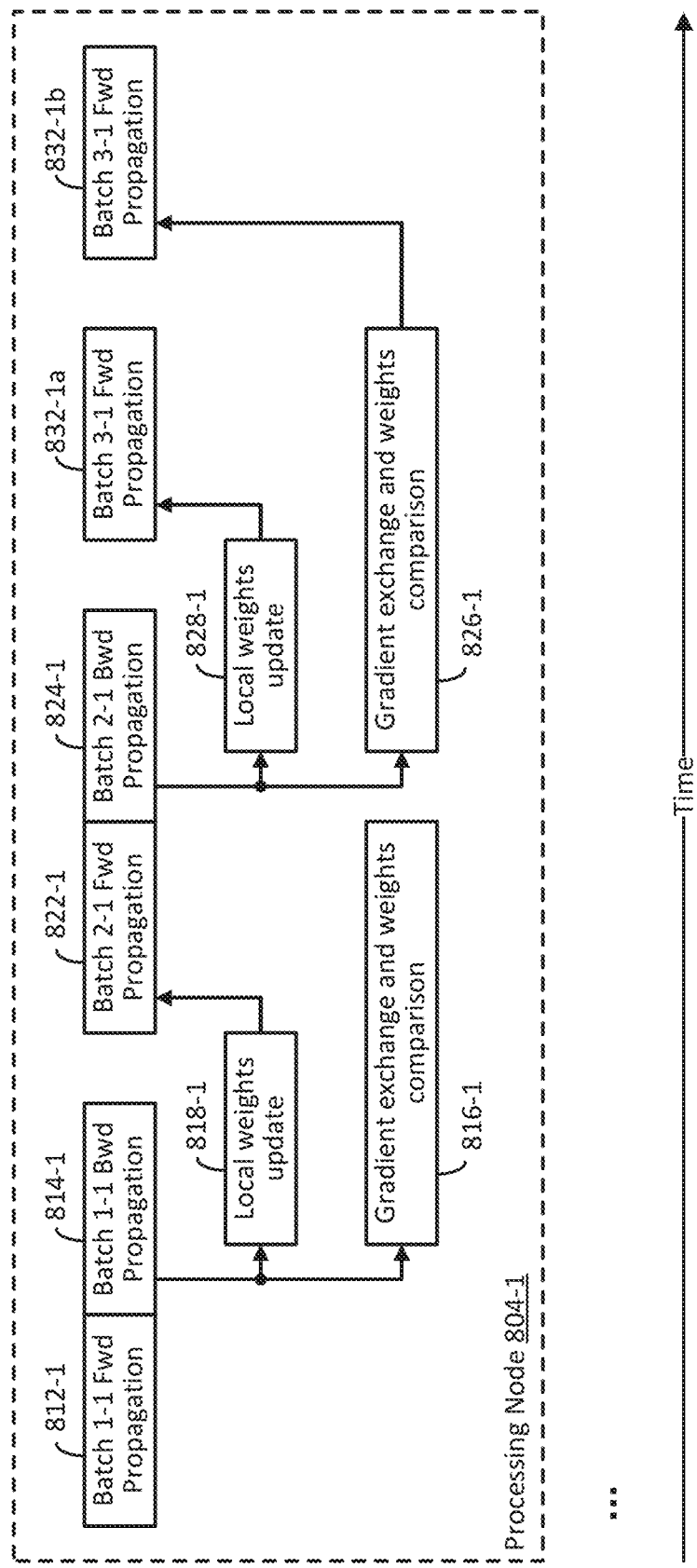
FIG. 8 illustrates a timing diagram of a further example of a training process.

FIG. 8 illustrates the timing diagram of a further example of a training process performed in a processing node of a neural network training system. The initial portion of the training process shown in FIG. 8 is similar to FIG. 7, and thus a description of which need not be repeated. The training process shown in FIG. 8 differs from that of FIG. 7 in the results of the gradients exchange and weights comparison process 826-1.

In the training process shown in FIG. 8, the difference between: (1) the set of speculative weights derived from the processing node 804-1's own set of local weight gradients obtained during backward propagation 824-1, and (2) the set of weights obtained from the gradients exchange process 826-1 (which is derived from averaged weight gradients across the processing nodes of the system) is determined to exceed a threshold difference. Under this scenario, the speculative weights may be too far off from the actual weights that the next iteration of the training process should be using. Consequently, instead of continuing the training process with the results obtained from computations performed on the batch 3-1 input data set using the set of speculative weights, the iteration of the training process on the batch 3-1 input data set is restarted with the set of weights obtained from the gradients exchange process 826-1. Thus, as shown in FIG. 8, processing node 804-1 may terminate the forward propagation 832-1a using the set of speculative weights, and restart this training iteration by repeating the computations with forward propagation 832-1b using the set of weights obtained from the gradients exchange process 826-1.

Although restarting an iteration of the training process may introduce some latency in the training process, the latency attributed to restarting a training iteration is not expected to be significantly more than the latency in waiting for the next set of weights to become available from the gradients exchange process. Furthermore, the number of instances in which a training iteration has to be restarted is expected to be less than the number of instances in which the speculative weights are acceptable. Accordingly, despite the few potential occasions of having to repeat a training iteration, the use of speculative weights to reduce the idle time in the system can still improve the overall training time of the neural network.

In some implementations, because each processing node of the system may continue updating the set of weights using its own local weight gradients instead of the averaged weight gradients across all processing nodes, it's possible that each processing node may end up with a different set of weight values as the training process progresses. Although the differences among the different sets of weights in the processing nodes are expected to be small (e.g., within the threshold difference), the system can improve the likelihood of convergence by performing a weight synchronization process after a predetermined number of iterations of the training process to synchronize the weight values across all the processing nodes of the neural network training system. For example, the weight synchronization process can be performed after ten iterations of the training process. The weight synchronization process may update the set of weights in each processing node to the set of weights derived based on averaged weight gradients for the most recent training iteration. In this manner, the system can ensure that each of the processing nodes will revert to a consistent set of weights during the training process.

Figure 9:
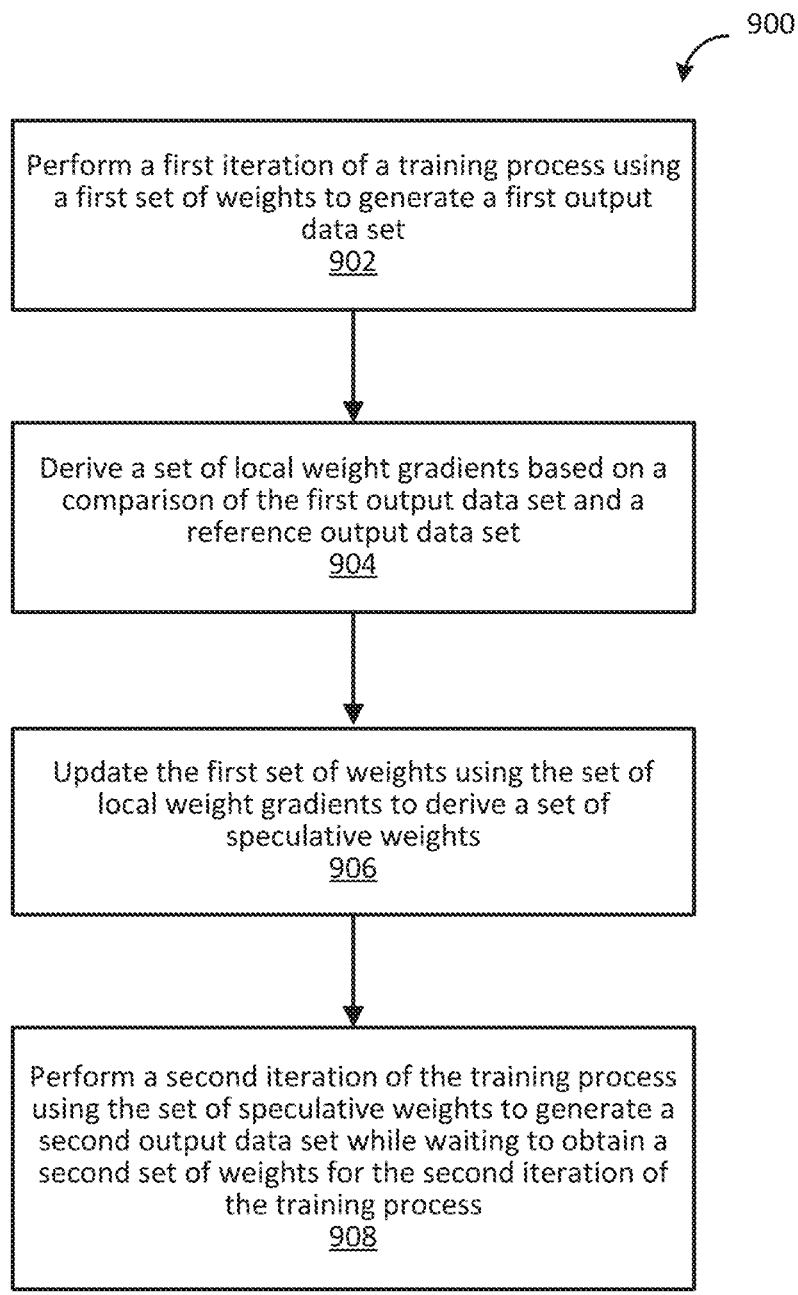
FIG. 9 illustrates a flow diagram of an example of a training process.

FIG. 9 illustrates a flow diagram of an example of a training process 900 that can be performed in a neural network training system having multiple processing nodes, according to some implementations. Process 900 can be performed in any one or more of the processing nodes of the neural network training system. In some implementations, each processing node of the neural network training system can implement neural network computation circuitry using a neural network processor, a neural network accelerator, a graphics processing unit (GPU), a field programmable gate array (FPGA), a co-processor, or an application specific integrated circuit (ASIC) to perform neural network computations such as matrix multiplication or dot products. In some implementations, each processing node can be a computing device that incorporates one or more of these components to perform neural network computations. The processing nodes of the neural network training system can be communicatively coupled to each other using chip or system interconnects, via a network, or a combination thereof. Furthermore, not every processing node of the neural network training system needs to use the same type of hardware to perform the neural network computations. For example, a neural network training system may include a GPU to perform computations for one processing node and a FPGA to perform computations for another processing node, etc.

Process 900 may begin at block 902 by a processing node performing a first iteration of a training process using a first set of weights to generate a first output data set. The input data set used to generate the first output data set can be a subset or a portion of the full training data set. The first iteration of the training process may include a forward propagation process in which computations performed on the input data set is propagated from the lowest layer of the neural network model to the highest layer of the neural network model to generate the first output data set. The first output data set can be compared with a reference output data set (e.g., the expected output) to determine the error of the neural network model operating on this particular input data set. The first iteration of the training process may also include a backward propagation process in which the error is propagated from the highest layer of the neural network model back to the lowest layer to determine how the weight values at each layer should be adjusted to improve the accuracy of the neural network model.

At block 904, a set of local weight gradients can be derived by the processing node based on a comparison of the first output data set and a reference output data set during the backward propagation process. The set of local weight gradients may include a weight gradient for each of the weight values in the neural network model. Each weight gradient can be represented as a partial derivative of the model's cost function (e.g., sum of squared errors, mean of squared errors, etc.) with respect to the corresponding weight.

At block 906, the first set of weights used in the first iteration of the training process can be updated using the set of local weight gradients of the processing node obtained in block 904 to derive a set of speculative weights for the processing node. For example, each speculative weight value can be derived by multiplying the corresponding local weight gradient with a scalar representing the learning rate, and adding the result to the corresponding weight value in the first set of weights. The weights update performed at block 906 can be performed locally at the processing node, and does not need to take into account the local weight gradients from the other processing nodes of the system. As such, the update at block 906 can be performed much faster than waiting for a gradients exchange process amongst the processing nodes to complete.

At block 908, a second iteration of the training process using the neural network computation circuitry with the set of speculative weights is performed to generate a second output data set while waiting to obtain a second set of weights for the second iteration of the training process. Similar to the first iteration of the training process, the second iteration may include a forward propagation process and a backward propagation process. The input data set that the second iteration operates on can be the same or different than the input data set used in the first iteration. Unlike the speculative weights which considered only the local weight gradients of the processing node itself, the second set of weights takes into account the local weight gradients from all the processing nodes of the system, and is derived from the set of averaged weight gradients calculated over the sets of local weight gradients generated by the processing nodes of system. By initiating the second iteration of the training process with the set of speculative weights instead of the second set of weights, the idle time in between training iterations can be reduced because the set of speculative weights can be calculated faster than the time it takes for the system to perform a gradient exchange process to obtain the second set of weights.

Figure 10:
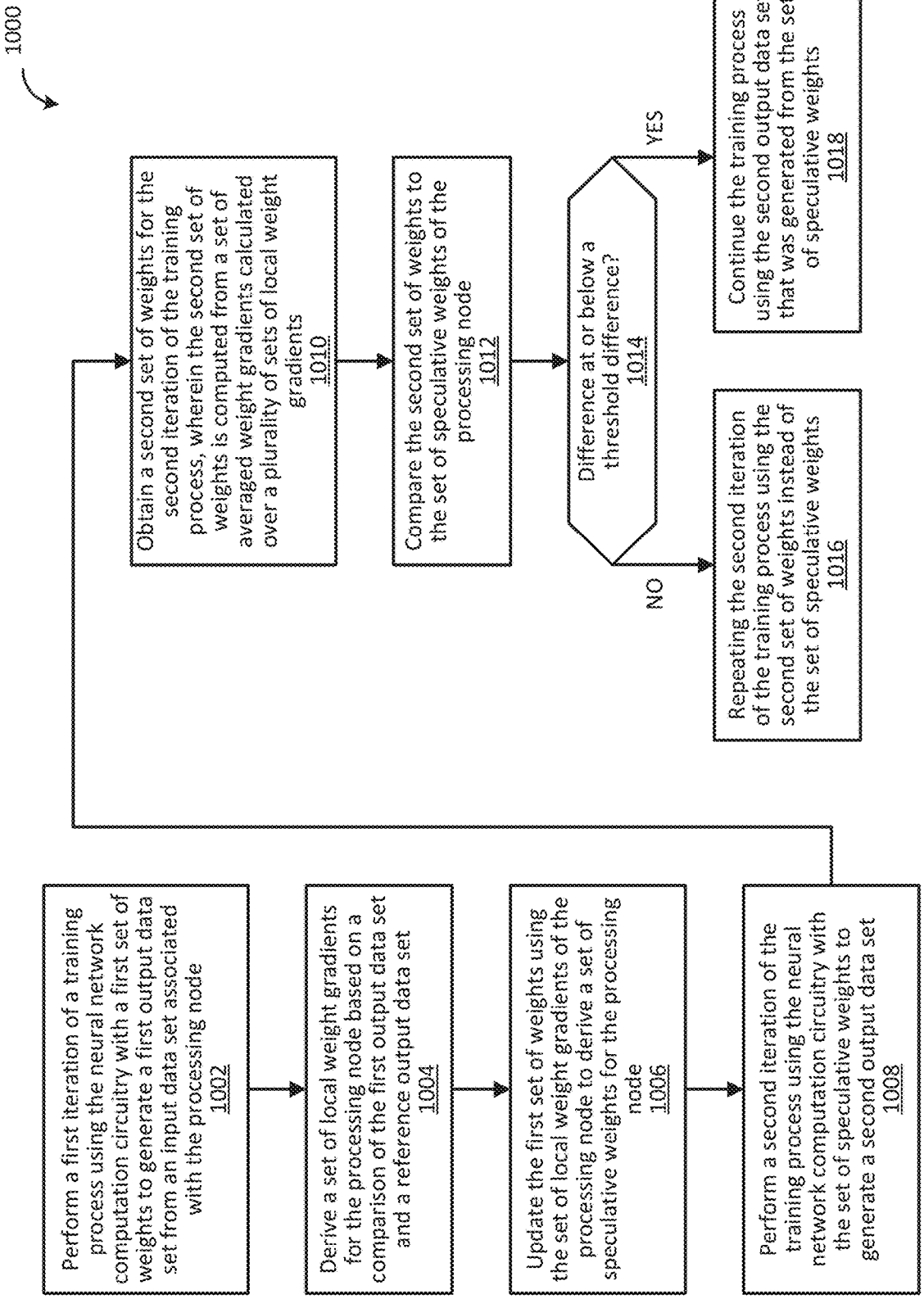
FIG. 10 illustrates a flow diagram of another example of a training process.

FIG. 10 illustrates a flow diagram of another example of a training process 1000 that can be performed in a neural network training system having multiple processing nodes, according to some implementations. Process 1000 can be performed in each of the processing nodes of the neural network training system. In some implementations, each processing node of the neural network training system can implement neural network computation circuitry using a neural network processor, a neural network accelerator, a graphics processing unit (GPU), a field programmable gate array (FPGA), a co-processor, or an application specific integrated circuit (ASIC) to perform neural network computations such as matrix multiplication or dot products. In some implementations, each processing node can be a computing device that incorporates one or more of these components to perform neural network computations. The processing nodes of the neural network training system can be communicatively coupled to each other using chip or system interconnects, via a network, or a combination thereof. Furthermore, not every processing node of the neural network training system needs to use the same type of hardware to perform the neural network computations. For example, a neural network training system may include a GPU to perform computations for one processing node and a FPGA to perform computations for another processing node, etc.

Process 1000 may begin at block 1002 by performing a first iteration of a training process using the neural network computation circuitry of the processing node with a first set of weights to generate a first output data set from an input data set associated with the processing node. The input data set associated with the processing node can be a subset or a portion of the full training data set. In other words, the full training data set can be divided into batches such that each processing node of the system may operate on a different subset of the training data to speed up the training process. The first iteration of the training process may include a forward propagation process in which computations performed on the input data set is propagated from the lowest layer of the neural network model to the highest layer of the neural network model to generate the first output data set. The first output data set can be compared with a reference output data set (e.g., the expected output) to determine the error of the neural network model operating on this particular input data set. The first iteration of the training process may also include a backward propagation process in which the error is propagated from the highest layer of the neural network model back to the lowest layer to determine how the weight values at each layer should be adjusted to improve the accuracy of the neural network model.

At block 1004, a set of local weight gradients for the processing node can be derived based on a comparison of the first output data set and the reference output data set during the backward propagation process. The set of local weight gradients may include a weight gradient for each of the weight values in the neural network model. Each weight gradient can be represented as a partial derivative of the model's cost function (e.g., sum of squared errors, mean of squared errors, etc.) with respect to the corresponding weight.

At block 1006, the first set of weights used in the first iteration of the training process can be updated using the set of local weight gradients of the processing node obtained in block 1004 to derive a set of speculative weights for the processing node. For example, each speculative weight value can be derived by multiplying the corresponding local weight gradient with a scalar representing the learning rate, and adding the result to the corresponding weight value in the first set of weights. This weights update at block 1006 can be performed locally and does not require taking into account the local weight gradients from the other processing nodes of the system. As such, the update at block 1006 can be performed much faster than waiting for a gradients exchange process amongst the processing nodes to complete.

At block 1008, a second iteration of the training process using the neural network computation circuitry with the set of speculative weights is performed to generate a second output data set. Similar to the first iteration of the training process, the second iteration may include a forward propagation process and a backward propagation process. The input data set that the second iteration operates on can be the same or different than the input data set used in the first iteration.

At block 1010, a second set of weights for the second iteration of the training process is obtained. The second set of weights can be obtained by receiving a communication containing the second set of weights from another processing node of the neural network training system, or by the processing node itself computing the second set of weights. This second set of weights is derived from the set of averaged weight gradients calculated over the sets of local weight gradients generated by the processing nodes of system. Thus, unlike the speculative weights which considered only the local weight gradients of the processing nod itself, this second set of weights takes into account the local weight gradients from all the processing nodes of the system. It should be noted that block 1010 can be performed concurrently with blocks 1006 and 1008, and that the second iteration of the training process in block 1008 can be performed while waiting for the second set of weights to become available in the neural network training system.

In some implementations, one of the processing nodes of the neural network training system can be configured to compute the second set of weights, and broadcast the second set of weights to other processing nodes of the neural network training system. For example, a gradients exchange process can be performed where each processing node sends their local weight gradients to the designated processing node. The designated processing node may accumulate the sets of local weight gradients (where each set is derived by a corresponding processing node of the neural network training system), average the sets of local weight gradients to derive a set of averaged weight gradients, and update the first set of weights using the set of averaged weight gradients to generate the second set of weights. Each of the averaged weight gradients can be computed by adding the corresponding local weight gradient from each processing node together, and dividing the sum by the number of processing nodes to derive the averaged weight gradient for the corresponding weight value.

In some implementations, each of the processing nodes of the neural network training system can be configured to compute the second set of weights. For example, a gradients exchange process can be performed where each processing node broadcasts its set of local weight gradients to the other processing nodes of the system, and each processing node of the system can then compute the set of averaged weight gradients using the local weight gradients received from the other processing nodes (e.g., as described above), and update the first set of weights accordingly.

At block 1012, the second set of weights derived from the set of averaged weight gradients is compared to the set of speculative weights of the processing node to determine a difference between the two sets of weights. In some implementations, the difference between the two sets of weights can be determined, for example, as the average of the differences between corresponding weight values from the two sets, the median of the differences between corresponding weight values from the two sets, the maximum of the differences between corresponding weight values from the two sets, or the root mean square of the differences between corresponding weight values from the two sets, etc. In other implementations, other metrics can be used to determine the difference between the two sets of weights. This difference provides a measure of how close or how far off the set of speculative weights is from the weights computed using the averaged weight gradients.

At block 1014, the difference between the second set of weights derived from the set of averaged weight gradients and the set of speculative weights of the processing node is compared with a threshold difference. The threshold difference can be chosen, for example, based on the accuracy tolerance of the system. For example, the threshold difference can be set to a higher value in systems that can tolerate a higher inaccuracy, and be set to a lower value in systems that may require greater accuracy.

At block 1016, if it is determine that the difference between the second set of weights and the set of speculative weights exceeds the threshold difference, then the set of speculative weights may be too far off from the second set of weights. Under such a scenario, the results of the second iteration of the training process using the set of speculative weights can be discarded, and the second iteration of the training process is restarted and repeated using the second set of weights instead of the set of speculative weights. At block 1018, if it is determine that the difference between the second set of weights and the set of speculative weights is at or below the threshold difference, the set of speculative weights are close enough to the second set of weights, and the training process may continue using the second output data set that was generated from the set of speculative weights.

In some implementations, a weight synchronization process can be performed after a predetermined number of iterations of the training process to synchronize the weight values across all the processing nodes of the neural network training system. For example, the weight synchronization process can be performed after ten iterations of the training process. The weight synchronization process may update the set of weights in each processing node to the weight values derived from the averaged weight gradients computed in the most recent training iteration. In this manner, the system can ensure that each of the processing nodes will revert to a consistent set of weights during the training process.

Figure 11:
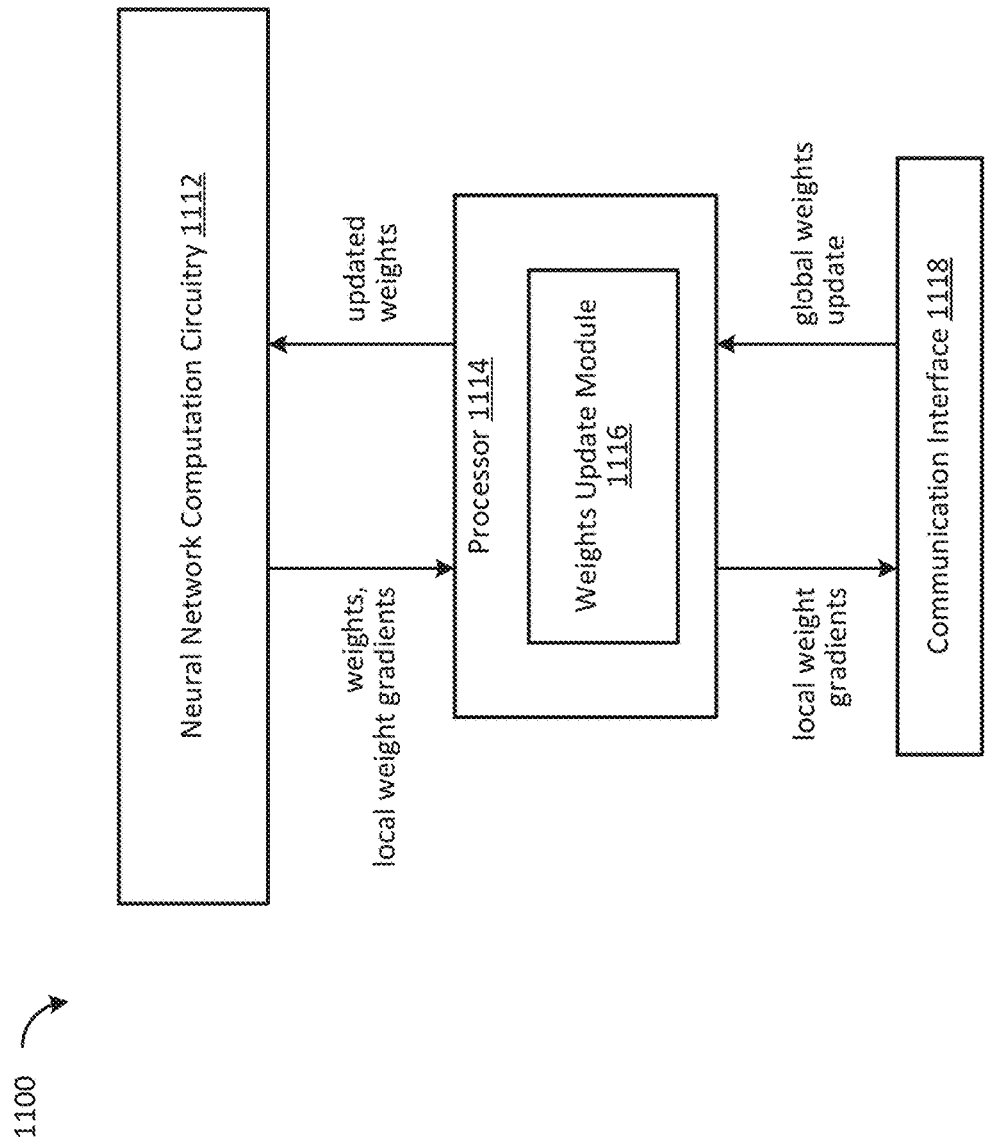
FIG. 11 illustrates a block diagram of an example of a computing device.

FIG. 11 illustrates an example of internal components of computing device 1100 that can be used as a processing node of a neural network training system. As shown in FIG. 11, computing device 1100 may include neural network computation circuitry 1112, a processor 1114, a weights update module 1116, and a communication interface 1118. In some implementations, weights update module 1116 can be implemented as software executed by processor 1114. In some implementations, weights update module 1116 can be implemented using application specific circuitry or be integrated as part of neural network computation circuitry 1112.

Neural network computation circuitry 1112 can be implemented using a neural network processor, neural network accelerator, a graphics processing unit (GPU), a field programmable gate array (FPGA), a co-processor, or an application specific integrated circuit (ASIC). Neural network computation circuitry 1112 can perform forward propagation operations and backward propagation operations. After neural network computation circuitry 1112 generates local weight gradients for a neural network layer, the local weight gradients can be sent to processor 1114, which manages the exchange operation of the weight gradients. As part of the exchange operation, processor 1114 can forward the local weight gradients to communication interface 1118 for transmission to other processing nodes via a computer network.

When weights update module 1116 receives the local weight gradients from neural network computation circuitry 1112, weights update module 1116 may compute the speculative weights using the local weight gradients and send the speculative weights as updated weights to neural network computation circuitry 1112 such that training on the next batch of data can be started. When processor 1114 receives a global weights update, weights update module 1116 can compare the difference between the weight values from the global weights update with the speculative weight values. If the difference is at or below a threshold difference, the training process can continue using the speculative weights. If the difference exceeds a threshold difference, weights update module 1116 may send the weight values from the global weights update weights to neural network computation circuitry 1112 and restart the training iteration using the weights from the global weights update.

In some implementations, processor 1114 can also receive weight gradients from other processing nodes via communication interface 1118. Weight update module 1116 can accumulate and average the weight gradients from the processing nodes of the system to generate averaged weight gradients for a neural network layer, compute the updated weight values using the averaged weight gradients, and determine whether the training process can continue using the speculative weights or be updated with the weight values derived from the averaged weight gradients.

Figure 12:
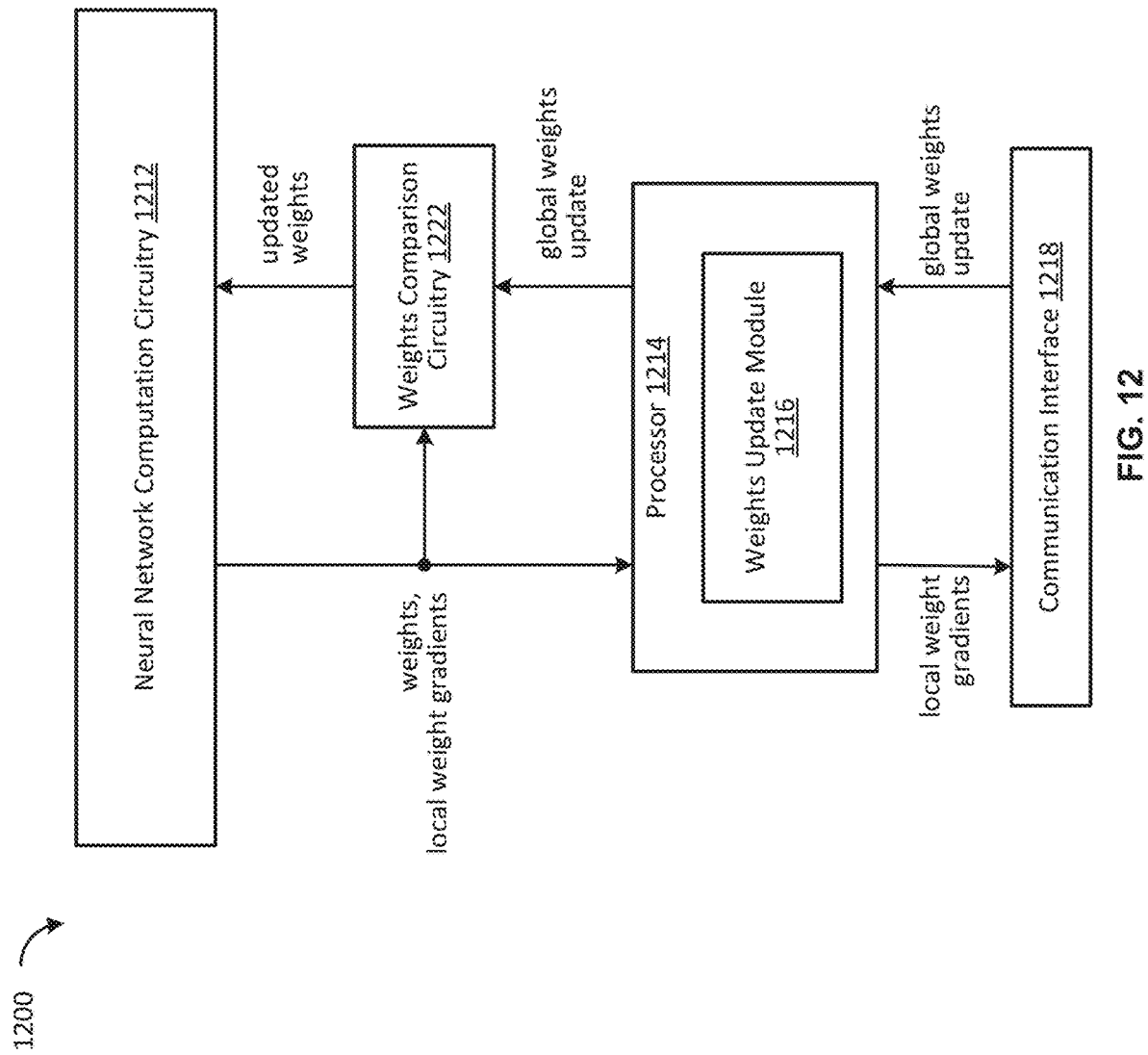
FIG. 12 illustrates a block diagram of another example of a computing device.

FIG. 12 illustrates a block diagram of another example of a computing device 1200 that can be used as a processing node of a neural network training system. Various components of computing device 1200 are similar to those discussed above with reference to FIG. 11, and thus a detailed description of which need not be repeated. Computing device 1200 differs from computing device 1100 shown in FIG. 11 in that computing device 1200 further includes weights comparison circuitry 1222. Weights comparison circuitry 1222 can be implemented, for example, using an arithmetic logic unit (ALU) or other suitable circuitry dedicated for comparing and/or computing weight values. Weights comparison circuitry 1222 may include circuitry configured to compare the difference between the set of speculative weights computed from a set of local gradients of the one processing node and the set of weights derived from sets of local gradients from all the processing nodes of the system against a difference threshold. In some implementations, weights comparison circuitry 1222 can also be used to compute the difference between the two sets of weights. In some implementations, weights comparison circuitry 1222 can further be used to compute the speculative weight values from the local weight gradients of the processing node, and/or to compute the weight values of the global weights update from the local weight gradients of all the processing nodes.

By incorporating weights comparison circuitry 1222 into computing device 1200, the computations involved in comparing the weight values and/or to compute the weight values can be offloaded from the other components of computing device 1200 (e.g., neural network computation circuitry 1212 and/or processor 1214) to the weights comparison circuitry 1222. The use of weights comparison circuitry 1222 can further reduce the training time because the neural network computation circuitry 1212 can continue with the training computations without interruption while weights comparison circuitry 1222 is comparing and/or computing the weight values. In such implementations, weights update module 1216 may only need to transmit the local weight gradients to the other processing nodes of the system and to receive the global weights update from the training system.

Figure 13:
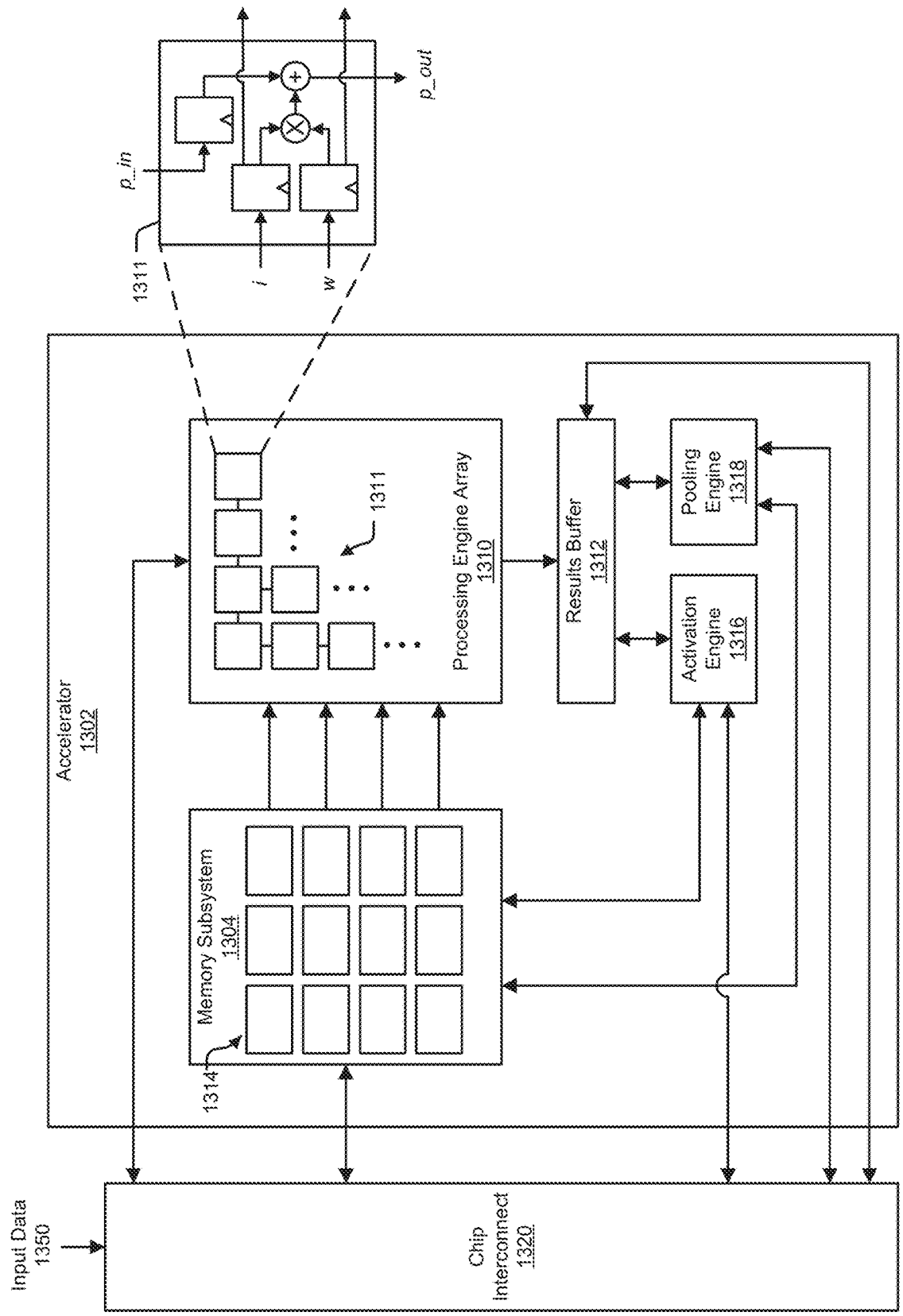
FIG. 13 illustrates a block diagram of an example of an integrated circuit device.

FIG. 13 is a block diagram illustrating an example of an integrated circuit device that can be used as neural network computation circuitry. The example of FIG. 13 illustrates an accelerator 1302. In various examples, the accelerator 1302, for a set of input data (e.g., input data 1350), can execute computations using a processing engine array 1310, an activation engine 1316, and/or a pooling engine 1318. In some examples, the example accelerator 1302 may be an integrated circuit component of a processor, such as a neural network processor. The processor may have other integrated circuit components, including additional accelerator engines.

In various implementations, the memory subsystem 1304 can include multiple memory banks 1314. In these implementations, each memory bank 1314 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1304 can permit simultaneous access to the read or write channels of multiple memory banks. As another example, the memory subsystem 1304 can include arbitration logic such that arbitration between, for example, the outputs of multiple memory banks 1314 can result in more than one memory bank's output being used. In these and other examples, though globally managed by the memory subsystem 1304, each memory bank can be operated independently of any other.

Having the memory banks 1314 be independently accessible can increase the efficiency of the accelerator 1302. For example, values can be simultaneously read and provided to each row of the processing engine array 1310, so that the entire processing engine array 1310 can be in use in one clock cycle. As another example, the memory banks 1314 can be read at the same time that results computed by the processing engine array 1310 are written to the memory subsystem 1304. In contrast, a single memory may be able to service only one read or write at a time. With a single memory, multiple clock cycles can be required, for example, to read input data for each row of the processing engine array 1310 before the processing engine array 1310 can be started.

In various implementations, the memory subsystem 1304 can be configured to simultaneously service multiple clients, including the processing engine array 1310, the activation engine 1316, the pooling engine 1318, and any external clients that access the memory subsystem 1304 over a communication fabric 1320. In some implementations, being able to service multiple clients can mean that the memory subsystem 1304 has at least as many memory banks as there are clients. In some cases, each row of the processing engine array 1310 can count as a separate client. In some cases, each column of the processing engine array 1310 can output a result, such that each column can count as a separate write client. In some cases, output from the processing engine array 1310 can be written into the memory banks 1314 that can then subsequently provide input data for the processing engine array 1310. As another example, the activation engine 1316 and the pooling engine 1318 can include multiple execution channels, each of which can be separate memory clients. The memory banks 1314 can be implemented, for example, using static random access memory (SRAM).

In various implementations, the memory subsystem 1304 can include control logic. The control logic can, for example, keep track of the address spaces of each of the memory banks 1314, identify memory banks 1314 to read from or write to, and/or move data between the memory banks 1314. In some implementations, memory banks 1314 can be hardwired to particular clients. For example, a set of memory banks 1314 can be hardwired to provide values to the rows of the processing engine array 1310, with one memory bank servicing each row. As another example, a set of memory banks can be hard wired to receive values from columns of the processing engine array 1310, with one memory bank receiving data for each column.

The processing engine array 1310 is the computation matrix of the example accelerator 1302. The processing engine array 1310 can, for example, execute parallel integration, convolution, correlation, and/or matrix multiplication, among other things. The processing engine array 1310 includes multiple processing engines 1311, arranged in rows and columns, such that results output by one processing engine 1311 can be input directly into another processing engine 1311. Processing engines 1311 that are not on the outside edges of the processing engine array 1310 thus can receive data to operate on from other processing engines 1311, rather than from the memory subsystem 1304.

In various examples, the processing engine array 1310 uses systolic execution, in which data arrives at each processing engine 1311 from different directions at regular intervals. In some examples, input data can flow into the processing engine array 1310 from the left and weight values can be loaded at the top. In some examples weights and input data can flow from the left and partial sums can flow from top to bottom. In these and other examples, a multiply-and-accumulate operation moves through the processing engine array 1310 as a diagonal wave front, with data moving to the right and down across the array. Control signals can be input at the left at the same time as weights, and can flow across and down along with the computation.

In various implementations, the number of columns in the processing engine array 1310 determines the computational capacity of the processing engine array 1310, and the number of rows determines the required memory bandwidth for achieving maximum utilization of the processing engine array 1310. The processing engine array 1310 can have, for example, 64 columns and 428 rows, or some other number of columns and rows.

An example of a processing engine 1311 is illustrated in FIG. 13 in an inset diagram. As illustrated by this example, a processing engine 1311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1311.

In the illustrated example, an input from above can include a partial sum, pin, provided either from another processing engine 1311 or from a previous round of computation by the processing engine array 1310. When starting a computation for a new set of input data, the top row of the processing engine array 1310 can receive a fixed value for p_in, such as zero. As illustrated by this example, i and w are multiplied together and the result is summed with p_in to produce a new partial sum, p_out, which can be input into another processing engine 1311. Various other implementations of the processing engine 1311 are possible.

Outputs from the last row in the processing engine array 1310 can be temporarily stored in the results buffer 1312. The results can be intermediate results, which can be written to the memory banks 1314 to be provided to the processing engine array 1310 for additional computation. Alternatively, the results can be final results, which, once written to the memory banks 1314 can be read from the memory subsystem 1304 over the communication fabric 1320, to be output by the system.

In some implementations, the accelerator 1302 includes an activation engine 1316. In these implementations, the activation engine 1316 can combine the results from the processing engine array 1310 into one or more output activations. For example, for a convolutional neural network, convolutions from multiple channels can be summed to produce an output activation for a single channel. In other examples, accumulating results from one or more columns in the processing engine array 1310 may be needed to produce an output activation for a single node in the neural network. In some examples, activation engine 1316 can be bypassed.

In various examples, the activation engine 1316 can include multiple separate execution channels. In these examples, the execution channels can correspond to the columns of the processing engine array 1310, and can perform an operation on the outputs of a column, the result of which can be stored in the memory subsystem 1304. In these examples, the activation engine 1316 may be able to perform between 1 and n parallel computations, where n is equal to the number of columns in the processing engine array 1310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1302 can include a pooling engine 1318. Pooling is the combining of outputs of the columns of the processing engine array 1310. Combining can include for example, computing a maximum value, a minimum value, an average value, a median value, a summation, a multiplication, or another logical or mathematical combination. In various examples, the pooling engine 1318 can include multiple execution channels that can operating on values from corresponding columns of the processing engine array 1310. In these examples, the pooling engine 1318 may be able to perform between 1 and n parallel computations, where n is equal to the number of columns in the processing engine array 1310. In various examples, execution channels of the pooling engine 1318 can operate in parallel and/or simultaneously. In some examples, the pooling engine 1318 can be bypassed.

Herein, the activation engine 1316 and the pooling engine 1318 may be referred to collectively as execution engines. The processing engine array 1310 is another example of an execution engine. Another example of an execution engine is a Direct Memory Access (DMA) engine, which may be located outside the accelerator 1302.

Input data 1350 can arrive over the communication fabric 1320. The communication fabric 1320 can connect the accelerator 1302 to other components of a processor, such as a DMA engine that can obtain input data 1350 from an Input/Output (I/O) device, a storage drive, or a network interface. The input data 1350 can be, for example one-dimensional data, such as a character string or numerical sequence, or two-dimensional data, such as an array of pixel values for an image or frequency and amplitude values over time for an audio signal. In some examples, the input data 1350 can be three-dimensional, as may be the case with, for example, the situational information used by a self-driving car or virtual reality data. In some implementations, the memory subsystem 1304 can include a separate buffer for the input data 1350. In some implementations, the input data 1350 can be stored in the memory banks 1314 when the accelerator 1302 receives the input data 1350.

In some examples, the accelerator 1302 can implement a neural network processing engine. In these examples, the accelerator 1302, for a set of input data 1350, can execute a neural network to perform a task for which the neural network was trained. Executing a neural network on a set of input data can be referred to as inference or performing inference.

The weights for the neural network can be stored in the memory subsystem 1304, along with input data 1350 on which the neural network will operate. The neural network can also include instructions, which can program the processing engine array 1310 to perform various computations on the weights and the input data. The instructions can also be stored in the memory subsystem 1304, in the memory banks 1314 or in a separate instruction buffer. The processing engine array 1310 can output intermediate results, which represent the outputs of individual layers of the neural network. In some cases, the activation engine 1316 and/or pooling engine 1318 may be enabled for computations called for by certain layers of the neural network. The accelerator 1302 can store the intermediate results in the memory subsystem 1304 for inputting into the processing engine array 1310 to compute results for the next layer of the neural network. The processing engine array 1310 can further output final results from a last layer of the neural network. The final results can be stored in the memory subsystem 1304 and then be copied out to host processor memory or to another location.

Figure 14:
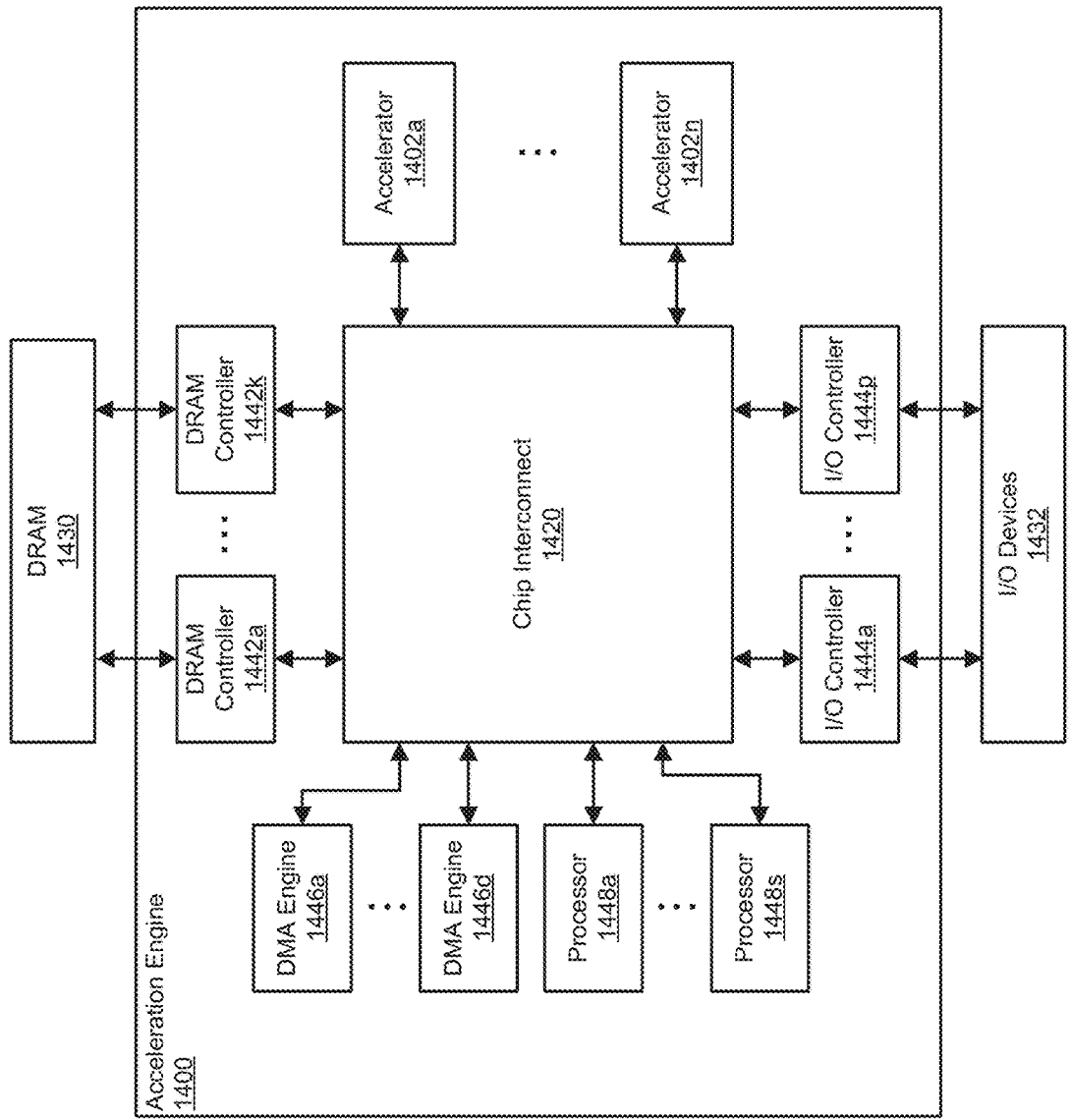
FIG. 14 includes a block diagram of an example of an acceleration engine.

FIG. 14 includes a block diagram that illustrates an example of an acceleration engine 1400. The acceleration engine 1400 is an example of an integrated circuit that can include one or more accelerators 1402a-1402n that may be similar to the accelerator illustrated in FIG. 11.

In the example of FIG. 14, the acceleration engine 1400 includes multiple accelerators 1402a-1402n, each of which can perform a set of operations. In various examples, the accelerators 1402a-1402n are for particular types of operations, so that the accelerators 1402a-1402n can perform the operations much faster than when similar operations are performed by a general purpose processor. In various examples, to perform a set of operations, input data on which the operations are to be performed must first be moved into the accelerators 1402a-1402n. Additionally, in some cases, program code is also moved into the accelerators 1402a-1402n, which programs the operations that the accelerators 1402a-1402n will perform on the data. In the illustrated example, the acceleration engine 1400 includes n accelerators 1402a-1402n. Examples of accelerators that can be included in the acceleration engine 1400 include graphics accelerators, floating point accelerators, neural network accelerators, and others. In various examples, the accelerators 1402a-1402n can each be the same (e.g., each of the is a graphics accelerator) or can be different (e.g., the accelerators 1402a-1402n include a graphics accelerator, a floating point accelerator, and neural network accelerator).

The example acceleration engine 1400 further includes DRAM controllers 1442a-1442k for communicating with an external memory. The external memory is implemented, in this example, using DRAM 1430. In the illustrated example, the acceleration engine 1400 includes k DRAM controllers 1442a-1442k, each of which may be able to communicate with an independent set of banks of DRAM. In other examples, other types of RAM technology can be used for the external memory. The DRAM controllers 1442a-1442k can also be referred to as memory controllers.

In various examples, input data and/or program code for the accelerators 1402a-1402n can be stored in the DRAM 1430. Different programs can cause the accelerators 1402a-1402n to perform different operations. For example, when one of the accelerators is a neural network accelerator, one program can configure the neural network accelerator to perform speech recognition while another program can configure the neural network accelerator to perform image recognition. In various examples, different accelerators 1402a-1402n can be programmed with different programs, so that each performs a different set of operations. In various examples, the processors 1448a-1448s can manage moving of program code from the DRAM 1430 to the accelerators 1402a-1402n.

The example acceleration engine 1400 further includes I/O controllers 1444a-1444p for communicating with I/O devices 1432 in the system. The acceleration engine 1400 can communicate with I/O devices over, for example, a processor bus. In some examples, the processor bus can be implemented using Peripheral Component Interconnect (PCI) and/or a variation of the PCI bus protocol. The processor bus can connect the acceleration engine 1400 to I/O devices such as, for example, input and output devices, memory controllers, storage devices, and/or network interface cards, among other things. In some examples, the I/O controllers 1444-1444p can enable the acceleration engine 1400 to act as an I/O device for a host processor. For example, the acceleration engine 1400 can be the recipient of input data from the host processor, and a command indicating an operation to be performed on the input data (e.g., a particular computation or analysis). In the illustrated example, the acceleration engine 1400 includes p I/O controllers 1444a-1444p, each of which may include a separate root complex and may communicate with a separate set of I/O devices 1432. In other examples, other standardized bus protocols, such as Ultra Path Interconnect (UPI) can be used for the host bus. In other examples, a proprietary bus protocol can be used.

Movement of data in the acceleration engine 1400 can be managed by one or more processors 1448a-1448s, which can also be referred to as data management processors. In the example of FIG. 14, the acceleration engine 1400 includes s processors 1448a-1448s incorporated into the device (e.g., on the same silicon die). In other examples, the processors 1448a-1448s can be external to the acceleration engine 1400 (e.g., on a different die and/or in a different package). In some examples, the processors 1448a-1448s can manage the movement of data from I/O devices 1432 to the accelerators 1402a-1402n or the DRAM 1430. For example, input data may be located at an I/O device 1432 or in processor memory, and the processors 1448a-1448s can move the input from the I/O device 1432 or processor memory into an accelerator or into DRAM 1430. As another example, program code for the accelerators 1402a-1402n may be located on an I/O device 1432 or in processor memory.

The example acceleration engine 1400 further includes DMA engines 1446a-1446d that can move data between the accelerators 1402a-1402n, DRAM controllers 1442a-1442k, and I/O controllers 1444a-1444p. In the illustrated example, the acceleration engine 1400 includes d DMA engines 1446a-1446d. In some implementations, the DMA engines 1446a-1446d can be assigned to specific tasks, such as moving data from the DRAM controllers 1442a-1442d to the accelerators 1402a-1402n, or moving data between the I/O controllers 1444a-1444p and the accelerators 1402a-1402n. These tasks can be assigned, for example, by enqueueing descriptors with the DMA engines 1446a-1446d, where a descriptor identifies an address for a block of data and an operation (e.g., a read or a write) to perform. A descriptor, for example, can direct a DMA engine to instruct a DMA controller to read a block of data from DRAM 1430. A descriptor can, as a further example, instruct the DMA engine to write data, read by the DMA controller, to an accelerator. Further descriptors can be used to move data from an accelerator to DRAM 1430.

In various examples, each of the processors 1448a-1448s can be responsible for managing the data movement for a different accelerator. In some examples, a processor may manage the data movement for more than one accelerator. Similarly, in various examples, each of the processors 1448a-1448s can be assigned to one or more DMA engines 1446a-1446d. In these and other examples, associations between processors 1448a-1448s, accelerators 1402a-1402n, and DMA engines 1446a-1446d are determined by program code being executed by each respective processor.

In the example acceleration engine 1400, the various components can communicate over a chip interconnect 1420. The chip interconnect 1420 primarily includes wiring for routing data between the components of the acceleration engine 1400. In some cases, the chip interconnect 1420 can include a minimal amount of logic, such as multiplexors to control the direction of data, flip-flops for handling clock domain crossings, and timing logic.

Figure 15:
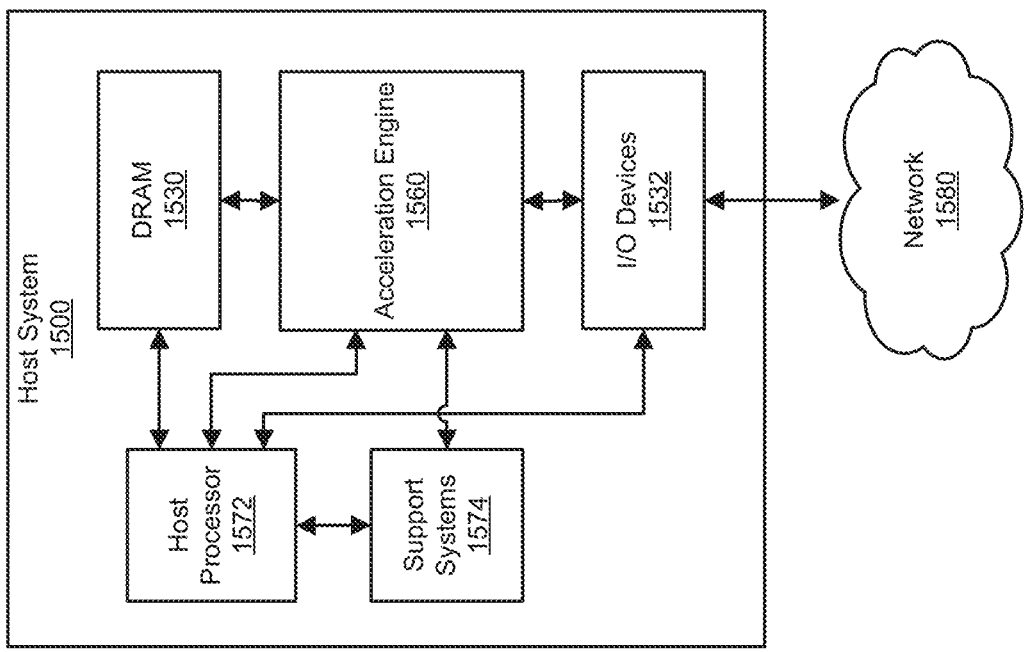
FIG. 15 includes a block diagram of an example of a host system.

FIG. 15 includes a block diagram that illustrates an example of a host system 1500 in which an acceleration engine 1560 can be used. The acceleration engine 1560 of FIG. 15 is an example of a device that can include one or more accelerators such as is illustrated in FIG. 12. The example host system 1500 of FIG. 15 includes the acceleration engine 1560, a host processor 1572, DRAM 1530 or processor memory, I/O devices 1532, and support systems 1574. In various implementations, the host system 1500 can include other hardware that is not illustrated here.

The host processor 1572 is a general purpose integrated circuit that is capable of executing program instructions. In some examples, the host processor 1572 can include multiple processing cores. A multi-core processor may include multiple processing units within the same processor. In some examples, the host system 1500 can include more than one host processor 1572. In some examples, the host processor 1572 and the acceleration engine 1560 can be one chip, such as, one or more integrated circuits within the same package.

In various examples, the host processor 1572 can communicate with other components in the host system 1500 over one or more communication channels. For example, the host system 1500 can include a host processor bus, which the host processor 1572 can use to communicate with the DRAM 1530, for example. As another example, the host system 1500 can include an I/O bus, such as a PCI-based bus, over which the host processor 1572 can communicate with the acceleration engine 1560 and/or the I/O devices 1532, for example. In various examples, the host system 1500 can, alternatively or additionally, include other communication channels or busses, such as serial busses, power management busses, storage device busses, and so on.

In some examples, software programs executing on the host processor 1572 can receive or generate input for processing by the acceleration engine 1560. In some examples, the programs can select an appropriate neural network to execute for a given input. For example, a program may be for language translation, and can select one or more neural networks capable of speech recognition and/or machine translation. In these and other examples, the programs can configure the acceleration engine 1560 with the neural network to execute, and/or can select a neural network processing engine on the acceleration engine 1560 that has previously been configured to execute the desired neural network. In some examples, once the acceleration engine 1560 has started an inference on input data, the host processor 1572 can manage the movement of data (such as weights, instructions, intermediate results, results of conditional layers, and/or final results) into or out of the acceleration engine 1560.

In some examples, a software program that is using the acceleration engine 1560 to conduct an inference can read the result from a conditional layer from the acceleration engine 1560 and/or from a storage location, such as in DRAM 1530. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1530 is memory that is used by the host processor 1572 for storage of program code that the host processor 1572 is in the process of executing, as well as values that are being operated on. In some examples, the data for a neural network (e.g., weight values, instructions, and other data) can be all or partially stored in the DRAM 1530. DRAM is a common term for processor memory, and though DRAM is volatile memory, processor memory can be volatile and/or non-volatile. Though not illustrated here, the host system 1500 can include other volatile and non-volatile memories for other purposes. For example, the host system 1500 can include a Read-Only Memory (ROM) that stores boot code for booting the host system 1500 at power on, and/or Basic Input/Output System (BIOS) code.

Though not illustrated here, the DRAM 1530 can store instructions for various programs, which can be loaded into and be executed by the host processor 1572. For example, the DRAM 1530 can be storing instructions for an operating system, one or more data stores, one or more application programs, one or more drivers, and/or services for implementing the features disclosed herein.

The operating system can manage and orchestrate the overall operation of the host system 1500, such as scheduling tasks, executing applications, and/or controller peripheral devices, among other operations. In some examples, a host system 1500 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1500. For example, some drivers can provide communication between the operating system and peripheral devices or I/O devices 1532. Alternatively or additionally, some drivers may provide communication between application programs and the operating system, and/or application programs and peripheral devices accessible to the host system 1500. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1532 can include hardware for connecting to user input and output devices, such as keyboards, mice, pens, tablets, voice input devices, touch input devices, displays or monitors, speakers, and printers, among other devices. The I/O devices 1532 can also include storage drives and/or network interfaces for connecting to a network 1580. For example, the host system 1500 can use a network interface to communicate with storage devices, user terminals, other computing devices or servers, and/or other networks, among various examples.

In various examples, one or more of the I/O devices 1532 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1500 or may be in an external enclosure. A storage device can be fixed (e.g., attached by screws) or removable (e.g., having a physical release mechanism and possibly a hot-plug mechanism).

Storage devices, the DRAM 1530, and any other memory component in the host system 1500 are examples of computer-readable storage media. Computer-readable storage media are physical mediums that are capable of storing data in a format that can be read by a device such as the host processor 1572. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1532 can be PCI-based devices. In these examples, a PCI-based I/O device includes a PCI interface for communicating with the host system 1500. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1574 can include hardware for coordinating the operations of the acceleration engine 1560. For example, the support systems 1574 can include a microprocessor that coordinates the activities of the acceleration engine 1560, including moving data around on the acceleration engine 1560. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1572. In some examples, the program executed by the microprocessor is stored on the hardware of microprocessor, or on a non-volatile memory chip in the host system 1500. In some examples, the microprocessor and the acceleration engine 1560 can be on chip, such as one integrated circuit on the same die and in the same package.

In some examples, the support systems 1574 can be responsible for taking instructions from the host processor 1572 when programs executing on the host processor 1572 request the execution of a neural network. For example, the host processor 1572 can provide the support systems 1574 with a set of input data and a task that is to be performed on the set of input data. In this example, the support systems 1574 can identify a neural network that can perform the task, and can program the acceleration engine 1560 to execute the neural network on the set of input data. In some examples, the support systems 1574 only needs to select an appropriate neural network processing engine of the neural network processor. In some examples, the support systems 1574 may need to load the data for the neural network onto the acceleration engine 1560 before the acceleration engine 1560 can start executing the neural network. In these and other examples, the support systems 1574 can further receive the output of executing the neural network, and provide the output back to the host processor 1572.

In some examples, the operations of the support systems 1574 can be handled by the host processor 1572. In these examples, the support systems 1574 may not be needed and can be omitted from the host system 1500.

In various examples, the host system 1500 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1500 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 16:
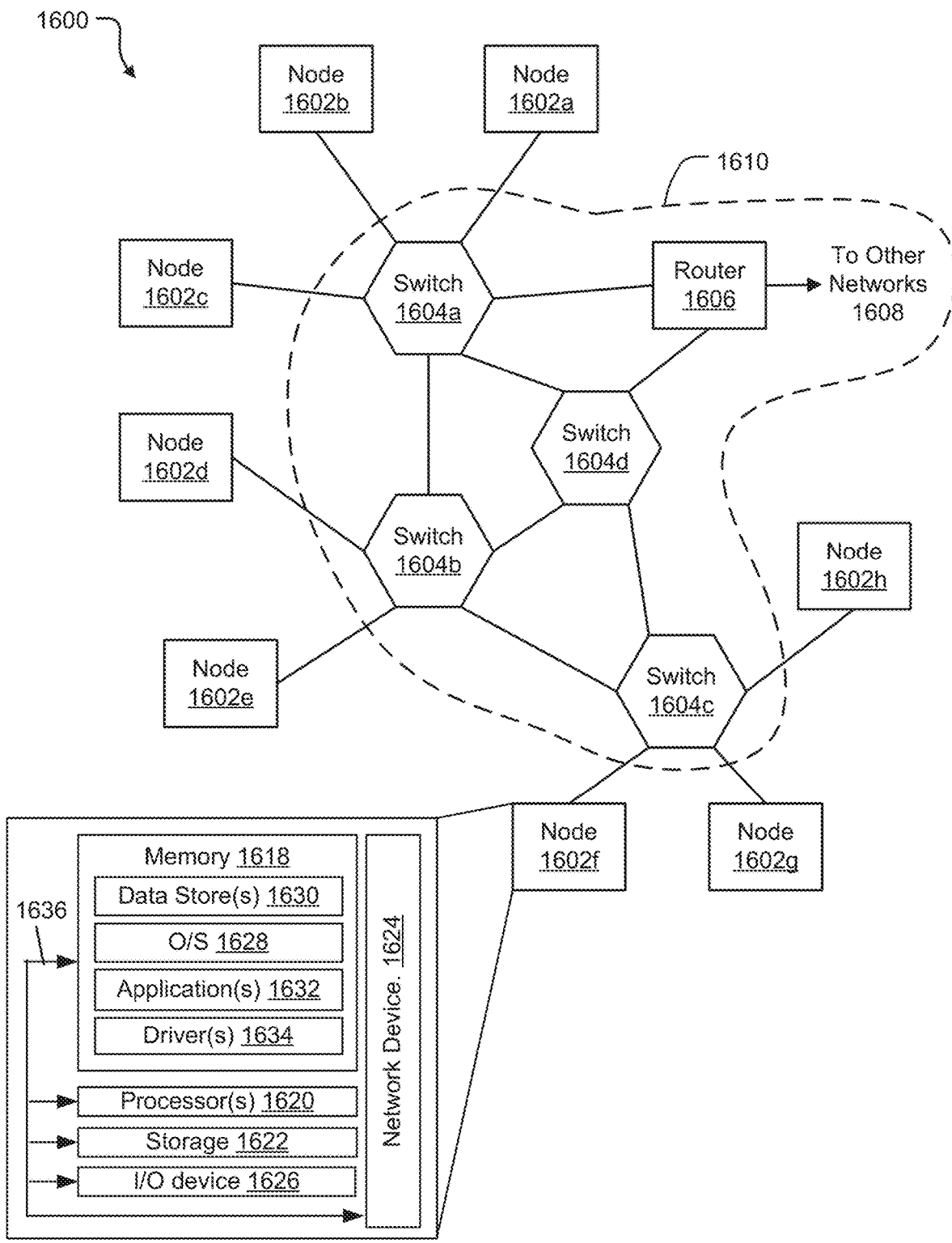
FIG. 16 includes a diagram of an example network.

FIG. 16 includes a diagram of an example network 1600, which can include one or more host systems, such as the host system illustrated in FIG. 15. For example, the example network 1600 of FIG. 16 includes multiple nodes 1602a-1602h, one or more of which can be a host system such as is illustrated in FIG. 15. Others of the nodes 1602a-1602h can be other computing devices, each of which include at least a memory for storing program instructions, a processor for executing the instructions, and a network interface for connecting to the network 1600.

In various examples, the network 1600 can be used to process data. For example, input data can be received at one of the nodes 1602a-1602h or from other networks 1608 with which the network 1600 can communicate. In this example, the input data can be directed to a node in the network 1600 that includes an acceleration engine, for the acceleration engine to operate on and produce a result. The result can then be transferred to the node or other network from which the input data was received. In various examples, input data can be accumulated from various sources, including one or more of the nodes 1602a-1602h and/or computing devices located in the other networks 1608, and the accumulated input data can be directed to one or more host systems in the network 1600. Results from the host systems can then be distributed back to the sources from which the input data was gathered.

In various examples, one or more of the nodes 1602a-1602h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 16, the nodes 1602a-1602h are connected to one another using a switched architecture with point-to point links. The switched architecture includes multiple switches 1604a-1604d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1604a-1604d of FIG. 16 may be connected to the nodes 1602a-1602h and provide multiple paths between any two nodes.

The network 1600 may also include one or more network devices for connection with other networks 1608, such as a router 1606. Routers use headers and forwarding tables to determine the best path for forwarding the packets, and use protocols such as internet control message protocol (ICMP) to communicate with each other and configure the best route between any two devices. The router 1606 of FIG. 16 can be used to connect to other networks 1608 such as subnets, LANs, wide area networks (WANs), and/or the Internet.

In some examples, network 1600 may include any one or a combination of many different types of networks, such as cable networks, the Internet, wireless networks, cellular networks and other private and/or public networks. The interconnected switches 1604a-1604d and the router 1606, if present, may be referred to as a switch fabric 1610, a fabric, a network fabric, or simply a network. In the context of a computer network, terms "fabric" and "network" may be used interchangeably herein.

The nodes 1602a-1602h may be any combination of host systems, processor nodes, storage subsystems, and I/O chassis that represent user devices, service provider computers or third party computers.

User devices may include computing devices to access an application 1632 (e.g., a web browser or mobile device application). In some aspects, the application 1632 may be hosted, managed, and/or provided by a computing resources service or service provider. The application 1632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1608. Additionally, the user device(s) may be part of the distributed system managed by, controlled by, or otherwise part of the service provider computer(s) (e.g., a console device integrated with the service provider computers).

The node(s) of FIG. 16 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1602a-1602h may include at least one memory 1618 and one or more processing units (or processor(s) 1620). The processor(s) 1620 may be implemented in hardware, computer-executable instructions, firmware, or combinations thereof. Computer-executable instruction or firmware implementations of the processor(s) 1620 may include computer-executable or machine-executable instructions written in any suitable programming language to perform the various functions described.

In some instances, the hardware processor(s) 1620 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1618 may store program instructions that are loadable and executable on the processor(s) 1620, as well as data generated during the execution of these programs. Depending on the configuration and type of the node(s) 1602a-1602h, the memory 1618 may be volatile (such as RAM) and/or non-volatile (such as ROM, flash memory, etc.). The memory 1618 may include an operating system 1628, one or more data stores 1630, one or more application programs 1632, one or more drivers 1634, and/or services for implementing the features disclosed herein.

The operating system 1628 may support nodes 1602a-1602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1628 may also be a proprietary operating system.

The data stores 1630 may include permanent or transitory data used and/or operated on by the operating system 1628, application programs 1632, or drivers 1634. Examples of such data include web pages, video data, audio data, images, user data, and so on. The information in the data stores 1630 may, in some implementations, be provided over the network(s) 1608 to user devices. In some cases, the data stores 1630 may additionally or alternatively include stored application programs and/or drivers. Alternatively or additionally, the data stores 1630 may store standard and/or proprietary software libraries, and/or standard and/or proprietary application user interface (API) libraries. Information stored in the data stores 1630 may be machine-readable object code, source code, interpreted code, or intermediate code.

The drivers 1634 include programs that may provide communication between components in a node. For example, some drivers 1634 may provide communication between the operating system 1628 and additional storage 1622, network device 1624, and/or I/O device 1626. Alternatively or additionally, some drivers 1634 may provide communication between application programs 1632 and the operating system 1628, and/or application programs 1632 and peripheral devices accessible to the service provider computer. In many cases, the drivers 1634 may include drivers that provide well-understood functionality (e.g., printer drivers, display drivers, hard disk drivers, Solid State Device drivers). In other cases, the drivers 1634 may provide proprietary or specialized functionality.

The service provider computer(s) or servers may also include additional storage 1622, which may include removable storage and/or non-removable storage. The additional storage 1622 may include magnetic storage, optical disks, solid state disks, flash memory, and/or tape storage. The additional storage 1622 may be housed in the same chassis as the node(s) 1602a-1602h or may be in an external enclosure. The memory 1618 and/or additional storage 1622 and their associated computer-readable media may provide non-volatile storage of computer-readable instructions, data structures, program modules, and other data for the computing devices. In some implementations, the memory 1618 may include multiple different types of memory, such as SRAM, DRAM, or ROM.

The memory 1618 and the additional storage 1622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1618 and the additional storage 1622 are examples of computer storage media. Additional types of computer storage media that may be present in the node(s) 1602a-1602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1602a-1602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1602a-1602h may also include I/O device(s) 1626, such as a keyboard, a mouse, a pen, a voice input device, a touch input device, a display, speakers, a printer, and the like. The node(s) 1602a-1602h may also include one or more communication channels 1636. A communication channel 1636 may provide a medium over which the various components of the node(s) 1602a-1602h can communicate. The communication channel or channels 1636 may take the form of a bus, a ring, a switching fabric, or a network.

The node(s) 1602a-1602h may also contain network device(s) 1624 that allow the node(s) 1602a-1602h to communicate with a stored database, another computing device or server, user terminals and/or other devices on the network(s) 1600.

In some implementations, the network device 1624 is a peripheral device, such as a PCI-based device. In these implementations, the network device 1624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1624 may be connected to a computing system using a PCIe interface.

A PCI-based device may include one or more functions. A "function" describes operations that may be provided by the network device 1624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A distributed neural network training system comprising:
  a plurality of processing nodes, each of the processing nodes comprising a computing device having:
    a communication interface; and
    neural network computation circuitry,
  wherein each of the processing nodes is configured to:
    perform a first iteration of a training process using the neural network computation circuitry with a first set of weights to generate a first output data set from an input data set associated with the processing node;
    derive a set of local weight gradients for the processing node based on a comparison of the first output data set of the first iteration and a reference output data set;
    update the first set of weights from the first iteration using the set of local weight gradients of the processing node to derive a set of speculative weights for the processing node;
    perform a second iteration of the training process using the neural network computation circuitry with the set of speculative weights to generate a second output data set while waiting for a second set of weights to be ready;
    obtain the second set of weights intended for the second iteration of the training process, wherein the second set of weights is computed from a set of averaged weight gradients calculated over a plurality of sets of local weight gradients, and wherein each set of local weight gradients is derived by a corresponding processing node of the plurality of processing nodes; and
    compare the second set of weights to the set of speculative weights of the processing node to determine a difference between the second set of weights and the set of speculative weights, and based on determining the difference:
      continue the training process using the second output data set that was generated from the set of speculative weights when the difference between the second set of weights and the set of speculative weights is at or below a threshold difference; or repeat the second iteration of the training process using the second set of weights instead of the set of speculative weights when the difference between the second set of weights and the set of speculative weights is above the threshold difference.

2. The distributed neural network training system of claim 1, wherein each of the processing nodes is further configured to perform, after a predetermined number of iterations of the training process, a weight synchronization operation using the communication interface to synchronize weight values across the plurality of processing nodes of the distributed neural network training system.

3. The distributed neural network training system of claim 1, wherein one of the processing nodes of the distributed neural network training system is configured to compute the second set of weights, and broadcast the second set of weights to other processing nodes of the distributed neural network training system.

4. A method comprising:
performing, by a processing node of a plurality of processing nodes in a neural network training system, a first iteration of a training process using a first set of weights to generate a first output data set from an input dataset, wherein each processing node includes a computing device having a communication interface and neural network computation circuitry;
deriving, by the processing node, a set of local weight gradients based on a comparison of the first output data set of the first iteration and a reference output data set;
updating, by the processing node, the first set of weights from the first iteration using the set of local weight gradients to derive a set of speculative weights;
performing, by the processing node, a second iteration of the training process using the set of speculative weights to generate a second output data set while waiting to obtain a second set of weights derived with the plurality of processing nodes for the second iteration of the training process;
obtaining the second set of weights for the second iteration of the training process, wherein the second set of weights is computed from a set of averaged weight gradients calculated over a plurality of sets of local weight gradients, and wherein each set of local weight gradients is derived by a corresponding processing node of the plurality of processing nodes; and
determining a difference between the second set of weights and the set of speculative weights, and based on determining the difference:
continuing the training process using the second output data set generated from the set of speculative weights when the difference between the second set of weights and the set of speculative weights is at or below a threshold difference; or
repeating the second iteration of the training process using the second set of weights instead of the set of speculative weights when the difference between the second set of weights and the set of speculative weights is above the threshold difference.

5. The method of claim 4, wherein the second set of weights is obtained from another processing node of the neural network training system.

6. The method of claim 4, wherein the second set of weights is obtained by:

accumulating a plurality of sets of local weight gradients, each set of local weight gradients being derived by a corresponding processing node of the plurality of processing nodes of the neural network training system;
averaging the sets of local weight gradients to derive a set of averaged weight gradients; and
updating the first set of weights using the set of averaged weight gradients to generate the second set of weights.

7. The method of claim 4, further comprising:
performing a weight synchronization operation after a predetermined number of iterations of the training process to synchronize weight values across the plurality of processing nodes of the neural network training system.

8. The method of claim 4, wherein the plurality of processing nodes are communicatively coupled to each other via a network.

9. The method of claim 4, wherein the threshold difference is set based on an accuracy tolerance.

10. The method of claim 4, wherein the difference is determined as an average of differences between corresponding weight values from the second set of weights and the set of speculative weights.

11. The method of claim 4, wherein the difference is determined as a median of differences between corresponding weight values from the second set of weights and the set of speculative weights.

12. The method of claim 4, wherein the difference is determined as a maximum of differences between corresponding weight values from the second set of weights and the set of speculative weights.

13. The method of claim 4, wherein the difference is determined as a root mean square of differences between corresponding weight values from the second set of weights and the set of speculative weights.

14. A computing device comprising:
neural network computation circuitry;
a processor; and
a memory storing code that, when executed by the processor, causes the computing device to implement operations including:
performing a first iteration of a training process using the neural network computation circuitry with a first set of weights to generate a first output data set from an input dataset;
deriving a set of local weight gradients based on a comparison of the first output data set of the first iteration and based on an expected output data set;
updating the first set of weights from the first iteration using the set of local weight gradients to derive a set of speculative weights;
performing a second iteration of the training process using the neural network computation circuitry with the set of speculative weights to generate a second output data set while waiting for a second set of weights for the second iteration of the training process to become available;
obtaining the second set of weights for the second iteration of the training process, wherein the second set of weights is generated by averaging a plurality of sets of local weight gradients, and wherein each set of local weight gradients is derived by a corresponding processing node of a plurality of processing nodes that each include a corresponding computing device having a communication interface and neural network computation circuitry in a neural network training system for the first iteration of the training process; and determining a difference between the second set of weights and the set of speculative weights, and based on determining the difference:

continuing the training process using the second output data set generated from the set of speculative weights when the difference between the second set of weights and the set of speculative weights is at or below a threshold difference; or repeating the second iteration of the training process using the second set of weights instead of the set of speculative weights when the difference between the second set of weights and the set of speculative weights is above the threshold difference.

15. The computing device of claim 14, wherein the second set of weights is obtained from one of the processing nodes of the neural network training system.

16. The computing device of claim 14, wherein the second set of weights is obtained by accumulating the plurality of sets of local weight gradients, averaging the sets of local weight gradients to derive a set of averaged weight gradients, and updating the first set of weights using the set of averaged weight gradients to generate the second set of weights.

17. The computing device of claim 14, wherein the neural network computation circuitry is a neural network processor, a neural network accelerator, a graphics processing unit (GPU), a field programmable gate array (FPGA), a co-processor, or an application specific integrated circuit (ASIC).

18. The computing device of claim 14, wherein the operations further include performing a weight synchronization process after a predetermined number of iterations of the training process to synchronize weight values across the plurality of processing nodes of the neural network training system.

19. The computing device of claim 14, further comprising weights comparison circuitry configured to compare a difference between the second set of weights and the set of speculative weights against the threshold difference.

20. A non-transitory computer readable medium having stored therein instructions that, when executed by a computing device in a neural network training system, cause the computing device to implement operations including:

performing a first iteration of a training process using a first set of weights to generate a first output data set from an input dataset;

deriving a set of local weight gradients based on a comparison of the first output data set of the first iteration and an expected output data set;

updating the first set of weights from the first iteration using the set of local weight gradients to derive a set of speculative weights;

performing a second iteration of the training process using the set of speculative weights to generate a second output data set while waiting to obtain a second set of weights for the second iteration of the training process;

obtaining the second set of weights for the second iteration of the training process, wherein the second set of weights is computed from a set of averaged weight gradients calculated over a plurality of sets of local weight gradients, and wherein each set of local weight gradients is derived by a plurality of processing nodes that each include a corresponding computing device having a communication interface and neural network computation circuitry; and determining a difference between the second set of weights and the set of speculative weights, and based on determining the difference:

continuing the training process using the second output data set generated from the set of speculative weights when the difference between the second set of weights and the set of speculative weights is at or below a threshold difference; or repeating the second iteration of the training process using the second set of weights instead of the set of speculative weights when the difference between the second set of weights and the set of speculative weights is above the threshold difference.

* * * * *